United States Patent
Park et al.

(10) Patent No.: US 9,596,064 B2
(45) Date of Patent: Mar. 14, 2017

(54) METHOD AND APPARATUS FOR TRANSMITTING OR RECEIVING DOWNLINK SIGNAL

(71) Applicant: LG ELECTRONICS INC., Seoul (KR)

(72) Inventors: Hanjun Park, Anyang-si (KR); Hakseong Kim, Anyang-si (KR); Byounghoon Kim, Anyang-si (KR); Hanbyul Seo, Anyang-si (KR); Jonghyun Park, Anyang-si (KR); Kijun Kim, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 14/396,014

(22) PCT Filed: May 16, 2013

(86) PCT No.: PCT/KR2013/004354
§ 371 (c)(1),
(2) Date: Oct. 21, 2014

(87) PCT Pub. No.: WO2013/172670
PCT Pub. Date: Nov. 21, 2013

(65) Prior Publication Data
US 2015/0049704 A1    Feb. 19, 2015

Related U.S. Application Data

(60) Provisional application No. 61/649,234, filed on May 18, 2012.

(51) Int. Cl.
*H04W 4/00* (2009.01)
*H04L 5/00* (2006.01)
(Continued)

(52) U.S. Cl.
CPC .......... *H04L 5/0035* (2013.01); *H04L 5/0048* (2013.01); *H04L 5/0051* (2013.01);
(Continued)

(58) Field of Classification Search
CPC ... H04L 5/0035; H04L 5/0048; H04L 5/0053; H04L 5/0094; H04L 5/0051;
(Continued)

(56) References Cited

U.S. PATENT DOCUMENTS 8,718,662 B2    5/2014 Shan et al.
2012/0176884 A1*    7/2012 Zhang ................ H04B 7/024
                                                            370/203
(Continued)

FOREIGN PATENT DOCUMENTS

KR    10-2010-0124677 A    11/2010
KR    10-2011-0085878 A    7/2011
(Continued)

OTHER PUBLICATIONS

Hitachi Ltd., "DL DMRS Enhancement for CoMP," 3GPP TSG RAN WG1 Meeting #68, Agenda Item 7.5.4.1, R1-120245, Feb. 6-10, 2012, Dresden, Germany, 4 pages.

*Primary Examiner* — Kevin Mew
(74) *Attorney, Agent, or Firm* — Birch, Stewart, Kolasch & Birch, LLP

(57) ABSTRACT

A method for receiving a downlink signal by user equipment in a wireless communication system that supports coordinated multiple-point transmission and reception (CoMP) according to one embodiment of the present invention includes receiving information regarding two candidate demodulation reference signal (DMRS) groups for generating a sequence of downlink demodulation reference signals; and generating a sequence of downlink demodulation reference signals using one of at least two candidate DMRS
(Continued)

configuration parameter sets. Each of at least two candidate DMRS configuration parameter sets includes a cell identifier and a scrambling identifier. The scrambling identifier included in one of at least two candidate DMRS configuration parameter sets may be determined whether the two cell identifiers included respectively in at least two candidate DMRS configuration parameter sets are the same or not.

20 Claims, 10 Drawing Sheets

(51) Int. Cl.
*H04W 72/04* (2009.01)
*H04L 27/26* (2006.01)
*H04B 7/02* (2006.01)
*H04W 88/02* (2009.01)
*H04W 88/08* (2009.01)

(52) U.S. Cl.
CPC .......... *H04L 5/0053* (2013.01); *H04L 5/0094* (2013.01); *H04L 27/2613* (2013.01); *H04W 72/042* (2013.01); *H04B 7/024* (2013.01); *H04W 88/02* (2013.01); *H04W 88/08* (2013.01)

(58) Field of Classification Search
CPC  H04L 27/2613; H04W 72/042; H04W 88/02; H04W 88/08; H04B 7/024
See application file for complete search history.

(56) References Cited

U.S. PATENT DOCUMENTS

| | | | |
|---|---|---|---|
| 2012/0275400 A1* | 11/2012 | Chen | H04J 11/0033 370/329 |
| 2012/0300728 A1 | 11/2012 | Lee et al. | |
| 2013/0022087 A1 | 1/2013 | Chen et al. | |
| 2013/0034070 A1* | 2/2013 | Seo | H04B 7/155 370/329 |
| 2013/0178220 A1* | 7/2013 | Lee | H04L 5/0007 455/450 |
| 2013/0201942 A1* | 8/2013 | Kim | H04W 76/045 370/329 |
| 2014/0064204 A1* | 3/2014 | Seo | H04L 5/0035 370/329 |
| 2014/0133425 A1* | 5/2014 | Kim | H04B 7/024 370/329 |
| 2014/0334403 A1* | 11/2014 | Park | H04L 27/2647 370/329 |
| 2015/0063234 A1* | 3/2015 | Park | H04B 7/024 370/329 |
| 2015/0063252 A1* | 3/2015 | Zhang | H04B 7/024 370/329 |
| 2015/0117291 A1* | 4/2015 | Seo | H04L 5/001 370/312 |
| 2015/0249973 A1* | 9/2015 | Park | H04L 5/001 370/329 |
| 2015/0271814 A1* | 9/2015 | Park | H04B 7/04 370/329 |

FOREIGN PATENT DOCUMENTS

| | | |
|---|---|---|
| KR | 10-2011-0108289 A | 10/2011 |
| WO | WO 2011/134377 A1 | 11/2011 |

* cited by examiner

METHOD AND APPARATUS FOR TRANSMITTING OR RECEIVING DOWNLINK SIGNAL

CROSS REFERENCE TO RELATED APPLICATIONS

This application is the National Phase of PCT International Application No. PCT/KR2013/004354, filed on May 16, 2013, which claims priority under 35 U.S.C. 119(e) to U.S. Provisional Application No. 61/649,234, filed on May 18, 2012, all of which are hereby expressly incorporated by reference into the present application.

TECHNICAL FIELD

The present invention relates to a wireless communication system and, more particularly, to a method for transmitting or receiving a downlink signal, and an apparatus therefor.

BACKGROUND ART

Recently, since various devices requiring machine-to-machine (M2M) communication and high data transfer rate, such as smartphones or tablet personal computers (PCs), have appeared and come into widespread use. This rapidly increases the quantity of data which needs to be processed in a cellular network. In order to satisfy the rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been spotlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has data throughput much higher than that of the legacy communication scheme in which each node operates as an independent base station (BS) to communicate with the UE without cooperation.

A multi-node system performs coordinated communication using a plurality of nodes, each of which operates as a base station or an access point, an antenna, an antenna group, a radio remote header (RRH), and a radio remote unit (RRU). Unlike the conventional centralized antenna system in which antennas are concentrated on a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by transmitting/receiving different data streams simultaneously. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to result in a decrease in pathloss and to enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communications with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for receiving or transmitting a downlink signal including or indicating control information for generating a downlink demodulation reference signal sequence.

Another object of the present invention devised to solve the problem lies in a method for determining specific control information based on relations defined between the control information for generating the downlink demodulation reference signal sequence.

It is to be understood that both the foregoing general description and the following detailed description of the present invention are exemplary and explanatory and are intended to provide further explanation of the invention as claimed.

Technical Solution

The object of the present invention can be achieved by providing a method for receiving a downlink signal by a User Equipment (UE) in a wireless communication system supporting Coordinated Multiple Point transmission and reception (CoMP), the method including receiving information about at least two candidate Demodulation Reference Signal (DMRS) configuration parameter sets for generating a sequence of a downlink DMRS, and generating the sequence of the downlink DMRS using one of the at least two candidate DMRS configuration parameter sets, wherein each of the at least two candidate DMRS configuration parameter sets includes a cell identity and a scrambling identity, and wherein the scrambling identity included in one of the at least two candidate DMRS configuration parameter sets is determined based on whether two cell identities respectively included in the at least two candidate DMRS configuration parameter sets are identical to each other.

Preferably, if the two cell identities are not identical, the scrambling identity included in one of the at least two candidate DMRS configuration parameter sets may be determined to be identical to the scrambling identity included in another of the at least two candidate DMRS configuration parameter sets.

Preferably, if the two cell identities are identical, the scrambling identity included in one of the at least two candidate DMRS configuration parameter sets may be determined to be different from the scrambling identity included in another of the at least two candidate DMRS configuration parameter sets.

Preferably, the method may further include receiving a signal indicating one of the at least two candidate DMRS configuration parameter sets.

Preferably, the signal may be specific information included in downlink control information.

Preferably, the signal may be additional information other than specific information included in downlink control information.

Preferably, each of the at least two candidate DMRS configuration parameter sets may further include information about slot number of a radio frame, and the information about the slot number of the radio frame may indicate a difference value between slot number of a radio frame of a serving cell and slot number of a radio frame of a cell other than the serving cell.

In another aspect of the present invention, provided herein is a method for transmitting a downlink signal by a Base Station (BS) in a wireless communication system supporting Coordinated Multiple Point transmission and reception (CoMP), the method including transmitting information about at least two candidate Demodulation Reference Signal (DMRS) configuration parameter sets for generating a sequence of a downlink DMRS, wherein one of the at least two candidate DMRS configuration parameter sets is used to generate the sequence of the downlink DMRS, wherein each of the at least two candidate DMRS configuration parameter sets includes a cell identity and a scrambling identity, and wherein the scrambling identity included in one of the at least two candidate DMRS configuration parameter sets is determined based on whether two cell identities respectively included in the at least two candidate DMRS configuration parameter sets are identical to each other.

In another aspect of the present invention, provided herein is a User Equipment (UE) configured to receive a downlink signal in a wireless communication system supporting Coordinated Multiple Point transmission and reception (CoMP), the UE including a Radio Frequency (RF) unit, and a processor configured to control the RF unit, wherein the processor is configured to receive information about at least two candidate Demodulation Reference Signal (DMRS) configuration parameter sets for generating a sequence of a downlink DMRS, and generate the sequence of the downlink DMRS using one of the at least two candidate DMRS configuration parameter sets, wherein each of the at least two candidate DMRS configuration parameter sets includes a cell identity and a scrambling identity, and wherein the scrambling identity included in one of the at least two candidate DMRS configuration parameter sets is determined based on whether two cell identities respectively included in the at least two candidate DMRS configuration parameter sets are identical to each other.

Preferably, if the two cell identities are not identical, the scrambling identity included in one of the at least two candidate DMRS configuration parameter sets may be determined to be identical to the scrambling identity included in another of the at least two candidate DMRS configuration parameter sets.

Preferably, if the two cell identities are identical, the scrambling identity included in one of the at least two candidate DMRS configuration parameter sets may be determined to be different from the scrambling identity included in another of the at least two candidate DMRS configuration parameter sets.

Preferably, the processor may be configured to further receive a signal indicating one of the at least two candidate DMRS configuration parameter sets.

Preferably, the signal may be specific information included in downlink control information.

Preferably, the signal may be additional information other than specific information included in downlink control information.

Preferably, each of the at least two candidate DMRS configuration parameter sets may further include information about slot number of a radio frame, and the information about the slot number of the radio frame may indicate a difference value between slot number of a radio frame of a serving cell and slot number of a radio frame of a cell other than the serving cell.

In another aspect of the present invention, provided herein is a Base Station (BS) for transmitting a downlink signal in a wireless communication system supporting Coordinated Multiple Point transmission and reception (CoMP), the BS including a Radio Frequency (RF) unit, and a processor configured to control the RF unit, wherein the processor is configured to transmit information about at least two candidate Demodulation Reference Signal (DMRS) configuration parameter sets for generating a sequence of a downlink DMRS, to a User Equipment (UE), wherein one of the at least two candidate DMRS configuration parameter sets is used to generate the sequence of the downlink DMRS, wherein each of the at least two candidate DMRS configuration parameter sets includes a cell identity and a scrambling identity, and wherein the scrambling identity included in one of the at least two candidate DMRS configuration parameter sets is determined based on whether two cell identities respectively included in the at least two candidate DMRS configuration parameter sets are identical to each other.

It is to be understood that both the foregoing general description and the following detailed description of the present invention are exemplary and explanatory and are intended to provide further explanation of the invention as claimed.

Advantageous Effects

According to an embodiment of the present invention, a downlink signal may be efficiently received and transmitted.

Furthermore, according to an embodiment of the present invention, a downlink demodulation reference signal sequence may be efficiently generated.

In addition, according to the present invention, a collision of radio resources may be prevented when a UE receives downlink signals from a plurality of cells or transmits uplink signals to a plurality of cells.

Besides, according to the present invention, the efficiency of using downlink resources may be increased.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
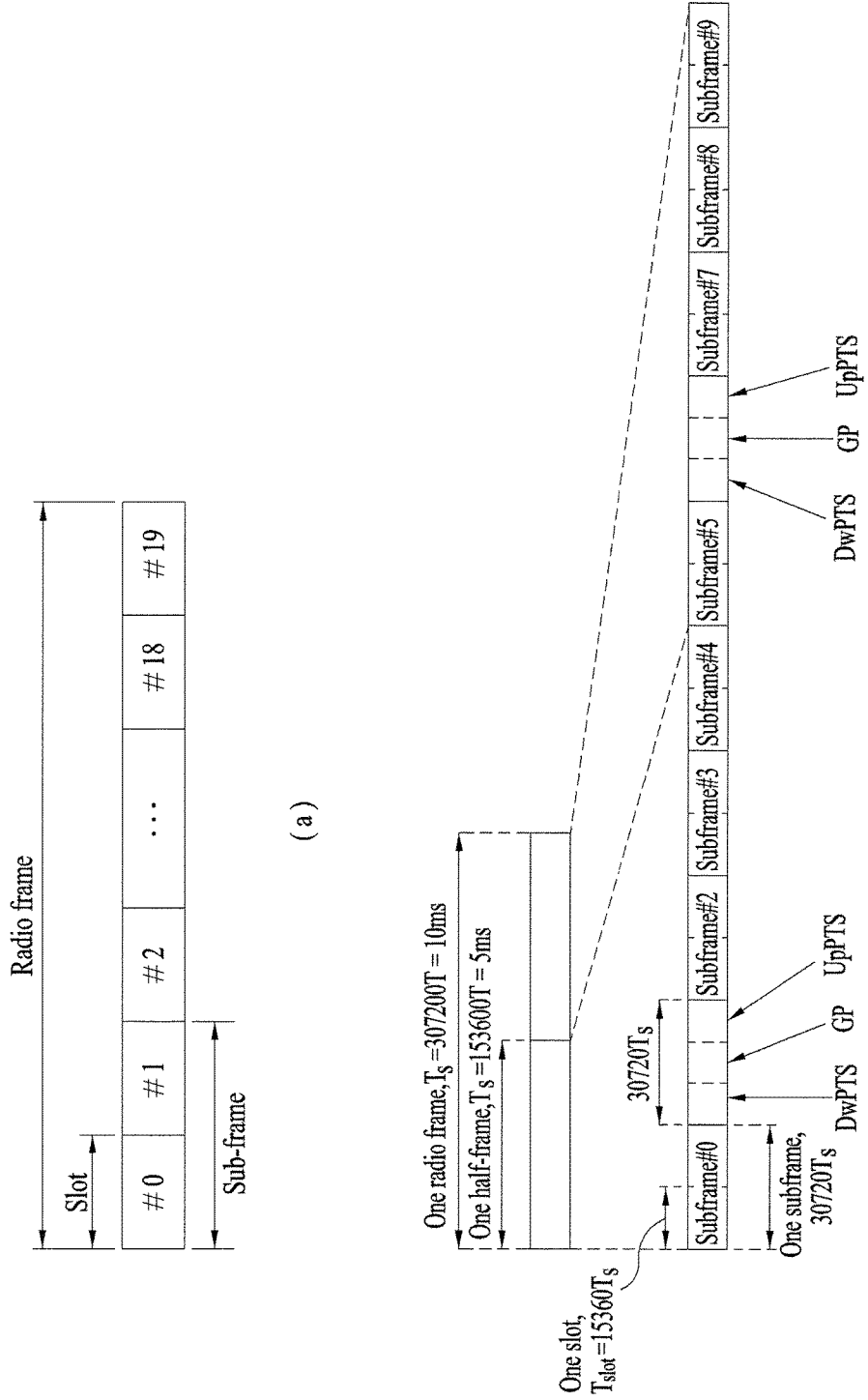
FIG. 1 illustrates an exemplary radio frame structure in a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device. In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS). In the following description, the term BS for use in the present invention will hereinafter be referred to as eNB.

In embodiments of the present invention, a node is a fixed point that communicates with a UE to transmit or receive a radio frequency (RF) signal to or from the UE. Various eNBs may be used as a node irrespective of names thereof. For example, a BS, NB, eNB, pico-cell eNB (PeNB), home eNB (HeNB), relay, or repeater may be used as a node. Also, a BS may not be used as a node as necessary. For example, a radio remote head (RRH) or radio remote unit (RRU) may be used as a node. RRH or RRU may have a lower power level than the eNB. RRH and/or RRU (hereinafter referred to as RRH/RRU) may be generally connected to the eNB through a dedicated line such as an optical cable, such that coordinated communication of RRH/RRU or eNB can be performed more smoothly than coordinated communication of eNBs interconnected through a radio link. At least one antenna is installed at a node. The antenna may be a physical antenna. Alternatively, the antenna may be an antenna port, virtual antenna, or an antenna group. The node may be referred to as a point. In a conventional centralized antenna system (CAS) (that is, single node system), antennas are centralized in a BS or eNB such that the antennas are controlled by a single eNB controller. In a multi-node system, on the other hand, a plurality of nodes is generally disposed at predetermined intervals. The nodes may be managed by one or more eNB or eNB controllers that control operations of the respective nodes or schedule data to be transmitted or received through the respective nodes. Each node may be connected to an eNB or eNB controller that controls the corresponding node via a cable or dedicated line. In the multi-node system, the same cell identifier (ID) or different cell IDs may be used to transmit or receive a signal to or from a plurality of nodes. In a case in which a plurality of nodes has the same cell ID in the multi-node system, each node serves as a group of some antennas of one cell. In a case in which a plurality of nodes has different cell IDs in the multi-node system, on the other hand, the multi-node system may be considered as a multi-cell (e.g., macro-cell, femto-cell, or pico-cell) system. When multiple cells respectively formed by the plurality of nodes are arranged in coverages in an overlaying manner, a network constructed by the multiple cells is called a multi-tier network. A cell ID of RRH/RRU may be identical to or different from that of the eNB. If the RRH/RRU and the eNB use different cell IDs, each of the RRH/RRU and the eNB operates as an independent BS or eNB.

In the multi-node system to be described in the following description, one or more eNBs or eNB controllers connected to a plurality of nodes can simultaneously transmit signals to UE(s) or simultaneously receive signals from the UE(s) through all or some of the plurality of nodes. While multi-node systems are distinguished according to the nature and implementation form of each node, the multi-node systems are different from single-node systems (e.g., CAS, conventional MIMO system, conventional relay system, conventional repeater system, etc.) since a plurality of nodes participates in a process of providing a communication service to UEs over a predetermined time-frequency resource. Accordingly, methods for performing coordinated transmission of data using all or some of a plurality of nodes according to embodiments of the present invention can be applied to various types of multi-node systems. Though a node generally refers to an antenna group spaced apart from other nodes by over a predetermined distance, the following embodiments of the present invention can be applied even when the node means an antenna group regardless of spacing. For instance, in the case of an eNB including cross polarized (X-pol) antennas, the embodiments of the present invention can be applied on the assumption that the eNB controls nodes configured with H-pol antennas and nodes configured with V-pol antennas.

A communication scheme for transmitting/receiving data through a plurality of transmission (Tx)/receiving (Rx) nodes, a communication scheme for transmitting/receiving signals through at least one node selected from among a plurality of Tx/Rx nodes, or a communication scheme for employing different nodes for transmission of DL and UL signals is referred to as multi-eNB MIMO or Coordinated multi-point Tx/Rx (CoMP). Among these multi-point coordinated communications, coordinated transmission schemes can be largely classified into Joint Processing (JP) and scheduling coordination. The former can be classified into Joint Transmission (JT)/Joint Reception (JR) and Dynamic Cell Selection (DCS), and the latter can be classified into Coordinated Scheduling (CS) and Coordinated Beamforming (CB). DPS is also referred to as Dynamic Cell Selection (DCS). Compared to other coordinated communication schemes, when the JP scheme from among coordinated communication schemes between nodes is performed, many more communication environments can be formed. Among the JP schemes, JT refers to a communication scheme for enabling a plurality of nodes to transmit the same stream to a UE, and JR refers to a communication scheme for enabling a plurality of nodes to receive the same stream from a UE. The UE and the eNB may synthesize signals received from the plurality of nodes so as to recover the stream using the synthesized result. In case of JT/JR, since the same stream is transmitted to or received from the plurality of nodes, signal transmission reliability can be improved by 1 transmission diversity. DPS from among the JP schemes refers to a communication scheme in which signals are transmitted and received through one node selected from among a plurality of nodes according to a specific rule. In case of DPS, a good-channel-status node selected from among nodes will be generally selected as a communication node for communication with the UE, such that signal transmission reliability can be improved.

On the other hand, the term "Cell" refers to a predetermined geographical region in which one or more nodes can provide a communication service. Therefore, "communication with a specific cell" in the present invention may refer to communication with an eNB or node that provides a communication service to the specific cell. In addition, DL/UL signals of the specific cell may refer to DL/UL signals from the eNB or node that provides a communication service to the specific cell. A cell for providing a UL/DL communication service to the UE is referred to as a serving cell. A channel state/quality of a specific cell may refer to a channel state/quality of a communication link or a channel formed between the eNB (or node) providing a communication service to the specific cell and the UE. In the 3GPP LTE-A system, the UE may measure a DL channel state from the specific node using CSI-RS(s) transmitted on CSI-RS resources allocated to the specific node by antenna port(s) of the specific node. Generally, contiguous nodes may transmit the corresponding CSI-RS resources through orthogonal CSI-RS resources. Orthogonality of CSI-RS resources indicates that at least one of a CSI-RS resource configuration specifying symbols and subcarriers carrying a CSI-RS, a subframe configuration specifying subframes to which CSI-RS is allocated according to a subframe offset and a transmission period, and a CSI-RS sequence is different from each other.

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of REs carrying Downlink Control Information (DCI), a set of REs carrying Control Format Indicator (CFI), a set of REs carrying downlink ACK/NACK (ACKnowlegement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal, respectively. In the present invention, RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource. Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

FIG. 1 exemplarily shows a radio frame structure for use in a wireless communication system. In more detail, FIG. 1(a) shows a frequency division duplexing (FDD) frame structure for use in the 3GPP LTE/LTE-A system, and FIG. 1(b) shows a time division duplexing (TDD) frame structure for use in the 3GPP LTE/LTE-A system.

Referring to FIG. 1, a 3GPP LTE/LTE-A radio frame is 10 ms ($307,200T_s$) in duration. The radio frame is divided into 10 equally-sized subframes, each subframe being 1 ms long. Subframe numbers may be assigned to the 10 subframes within the radio frame, respectively. For example, the 10 subframes may be sequentially numbered from 0 to 9. $T_s$ represents a sampling time and is given as $T_s=1/(2048\times15$ kHz). Each subframe is further divided into two slots, each 0.5 ms in duration. 20 slots are sequentially numbered from 0 to 19. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may be differently constructed according to a duplex mode. For example, in the FDD mode, DL transmission and UL transmission are discriminated according to a frequency, such that the radio frame includes only one of a DL subframe and a UL subframe in a specific frequency domain. On the other hand, in the TDD mode, DL transmission and UL transmission are discriminated according to time, such that a radio frame includes both a DL subframe and a UL subframe in a specific frequency domain.

Table 1 shows an exemplary DL-UL construction in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D denotes a DL subframe, U denotes a UL subframe, and S denotes a special subframe. Specifically, the special subframe S includes three fields, i.e., a Downlink Pilot TimeSlot (DwPTS) field, a Guard Period (GP) field, and an Uplink Pilot TimeSlot (UpPTS) field. DwPTS is a time interval reserved for DL transmission, and UpPTS is a time interval reserved for UL transmission. Table 2 shows a special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |

Figure 2:
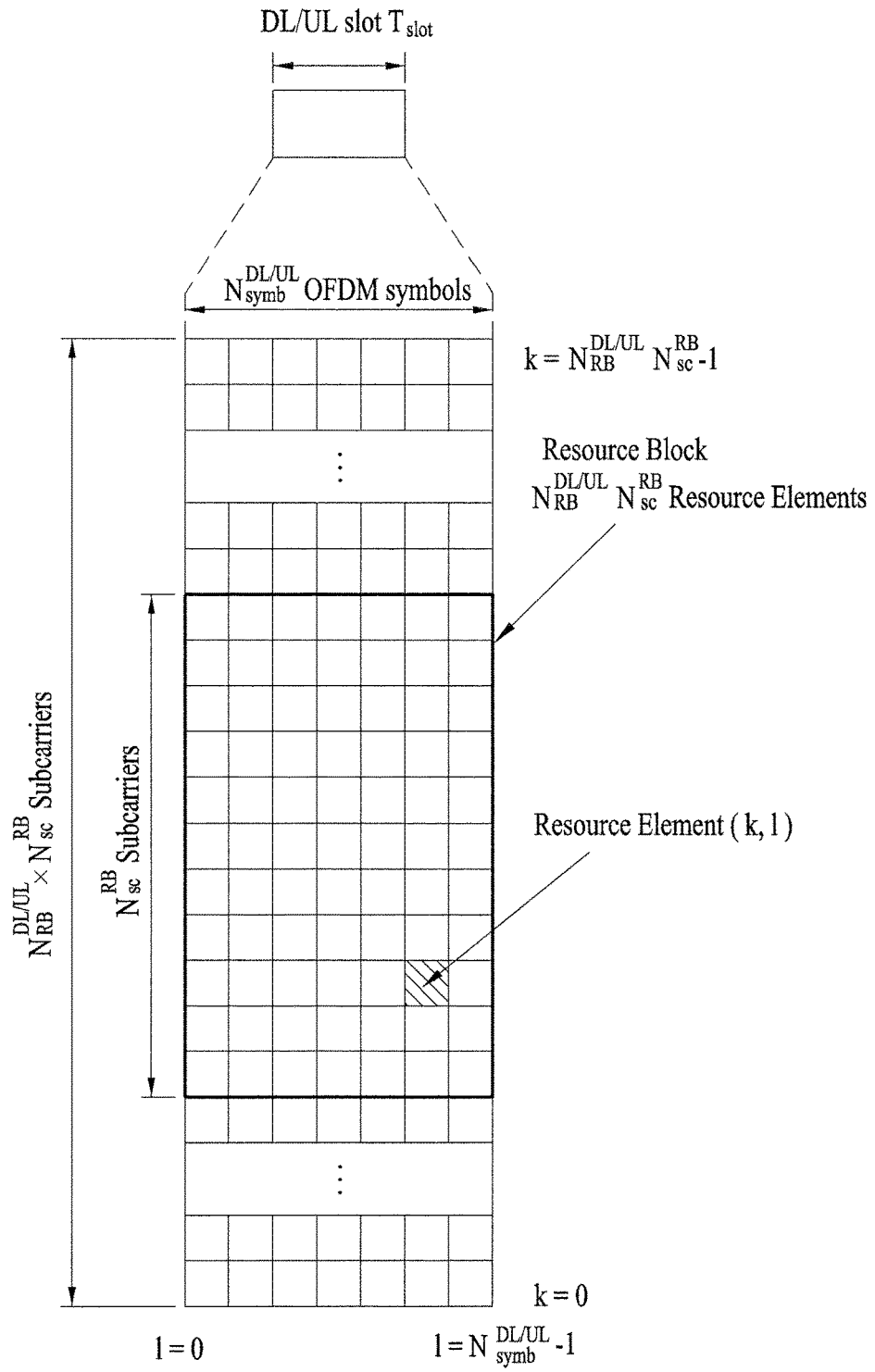
FIG. 2 illustrates an exemplary structure of a Downlink/Uplink (DL/UL) slot in a wireless communication system.

FIG. 2 exemplarily shows a downlink/uplink (DL/UL) slot structure for use in a wireless communication system. In more detail, FIG. 2 shows a resource grid structure of the 3GPP LTE/LTE-A system. As can be seen from FIG. 2, a resource grid is assigned per antenna port.

Referring to FIG. 2, one slot may include a plurality of OFDM symbols in a time domain and include a plurality of Resource Blocks (RBs) in a frequency domain. The OFDM symbol may also indicate a single symbol interval. A transmission (Tx) signal for each slot may be denoted by a resource grid composed of $N_{RB}^{DL/UL} \times N_{sc}^{RB}$ subcarriers and $N_{symb}^{DL/UL}$ OFDM symbols. In this case, $N_{RB}^{DL}$ denotes the number of RBs included in the downlink slot. $N_{RB}^{UL}$ denotes the number of RBs included in the uplink slot. $N_{RB}^{DL}$ and $N_{RB}^{UL}$ are dependent upon a DL transmission bandwidth and a UL transmission bandwidth, respectively. $N_{symb}^{DL}$ is the number of OFDM symbols contained in the DL slot, and $N_{symb}^{UL}$ is the number of OFDM symbols contained in the UL slot. $N_{sc}^{RB}$ is the number of subcarriers contained in one RB.

OFDM symbols may be referred to as OFDM symbols or SC-FDM symbols according to a multiple access method. The number of OFDM symbols included in one slot may be variously changed depending upon a channel bandwidth and the length of a Cylic Prefix (CP). For example, in case of a normal CP, one slot includes 7 OFDM symbols. In case of an extended CP, on the other hand, one slot includes 6 OFDM symbols. In FIG. 2, a subframe having 7 OFDM symbols for each slot is shown for convenience of description. However, the embodiments of the present invention may be applied to subframes having a different number of OFDM symbols in the same manner. Referring to FIG. 2, each OFDM symbol includes $N_{RB}^{DL/UL} \times N_{sc}^{RB}$ subcarriers in a frequency domain. Subcarriers may be classified into a data subcarrier for data transmission, a reference signal subcarrier for reference signal (RS) transmission, and a null subcarrier for a guard band and direct current (DC) component. The null subcarrier for the direct current (DC) component is an unused subcarrier. The null subcarrier for the direct current (DC) component is mapped into a carrier frequency ($f_0$) during an OFDM signal generation process or a frequency up-conversion process. The carrier frequency may also be referred to as a center frequency.

One RB is defined as contiguous $N_{symb}^{DL/UL}$ (for example, 7) OFDM symbols in a time domain and is also defined as contiguous $N_{sc}^{RB}$ (for example, 12) subcarriers in a frequency domain. For reference, a resource including one OFDM symbol and one subcarrier is referred to as a resource element (RE) or a tone. Consequently, one RB includes $N_{symb}^{DL/UL} \times N_{sc}^{RB}$ resource elements (REs). Each resource element (RE) contained in a resource grid may be uniquely defined by an index pair (k, l) in one slot. Where, k indicates indexes given from 0 to $N_{RB}^{DL/UL} \times N_{sc}^{RB} - 1$ in a frequency domain, and l indicates indexes given from 0 to $N_{symb}^{DL/UL} - 1$ in a time domain.

In one subframe, two RBs respectively located in two slots of the subframe while occupying contiguous $N_{sc}^{RB}$ same subcarriers are referred to as a physical resource block (PRB) pair. Two RBs constituting a PRB pair have the same PRB number (or PRB index).

Figure 3:
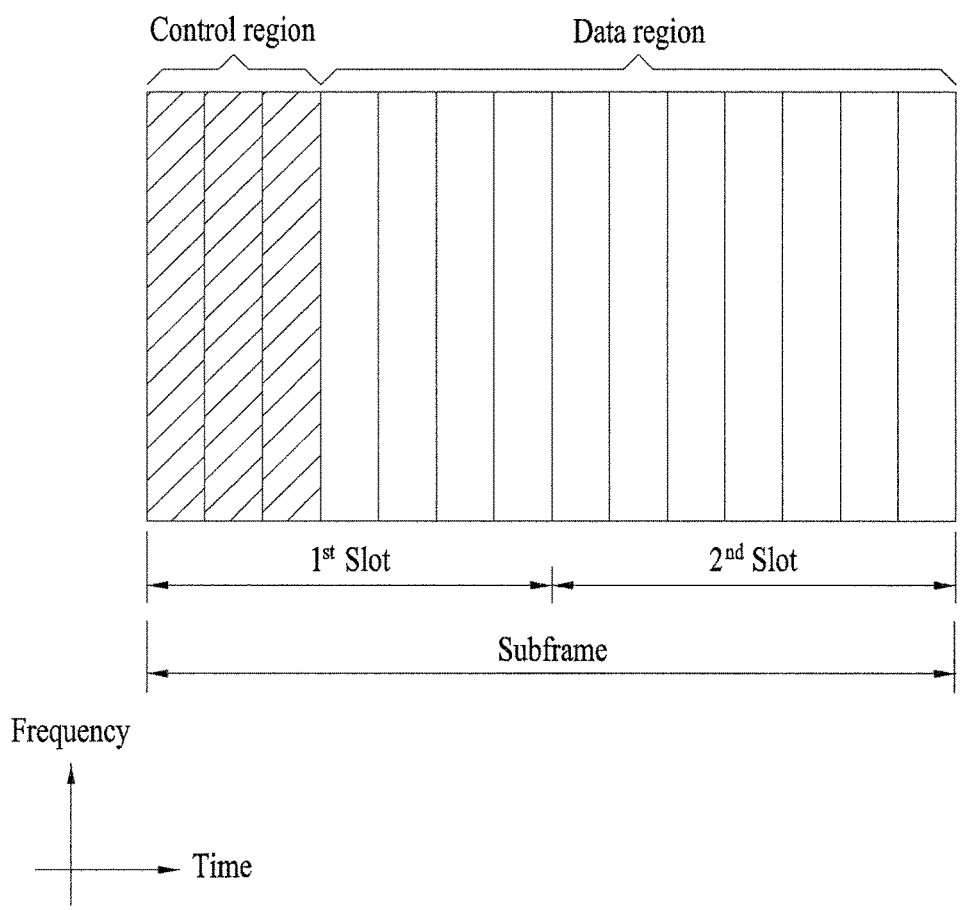
FIG. 3 illustrates an exemplary structure of a DL subframe in a 3$^{rd}$ Generation Partnership project (3GPP) Long Term Evolution (LTE)/LTE-Advanced (LTE-A) system.

FIG. 3 is a view showing an example of a DL subframe structure used in a 3GPP LTE/LTE-A system.

Referring to FIG. 3, a DL subframe may be divided into a control region and a data region in a time domain. Referring to FIG. 3, maximum three (or four) front OFDM symbols in a first slot of the subframe correspond to the control region to which a control channel is assigned. Hereinafter, a resource region of the DL subframe available for PDCCH transmission will be referred to as a PDCCH region. The remaining OFDM symbols other than OFDM symbol(s) used as a control region correspond to the data region to which a Physical Downlink Shared Channel (PDSCH) is assigned. Hereinafter, a resource region of the DL subframe available for PDSCH transmission will be referred to as a PDSCH region. Examples of DL control channels used in 3GPP LTE include a Physical Control Format Indicator Channel (PCFICH), Physical Downlink Control Channel (PDCCH), and Physical hybrid ARQ indicator Channel (PHICH). PCFICH carries information regarding the number of OFDM symbols transmitted from the first OFDM symbol of a subframe and used to transmit a control channel in the subframe. PHICH carries a Hybrid Automatic Repeat Request acknowledgment/negative-acknowledgment (HARQ ACK/NACK) signal in response to UL transmission.

Control information transmitted through PDCCH is referred to as Downlink Control Information (DCI). DCI includes resource assignment information for a UE or UE group and other Control Information. For example, DCI includes transmission format and resource assignment information of a downlink shared channel (DL-SCH), transmission format and resource assignment information of an uplink shared channel (UL-SCH), paging information on a paging channel (PCH), system information on DL-SCH, resource assignment information of an upper layer control message, such as arbitrary connection response, transmitted on PDSCH, a Transmit Control Command Set regarding individual UEs in a UE group, a Transmit Power Control (TPC) command, Voice over IP (VoIP) activation indication information, and a Downlink Assignment Index (DAT). Transmission format and resource assignment information of a downlink shared channel (DL-SCH) is also referred to as DL scheduling information or DL grant, and transmission format and resource assignment information of an uplink shared channel (UL-SCH) is also referred to as UL scheduling information or UL grant. DCI carried by one PDCCH may have different sizes and usages according to a DCI format. If necessary, the DCI size may also be changed according to a coding rate. A variety of DCI formats are defined in the 3GPP LTE system, for example, formats 0 and 4 for uplink, and formats 1, 1A, 1B, 1C, 1D, 2, 2A, 2B, 2C, 3, 3A, etc. for downlink. DCI format may selectively include a variety of control information according to various usages, such that the selected control information is transmitted as DL control information to the UE. For example, DCI format may selectively include a hopping flag, RB allocation, modulation coding scheme (MCS), redundancy version (RV), new data indicator (NDI), transmit power control (TPC), cyclic shift demodulation reference signal (CS DM RS), channel quality information (CQI) request, HARQ process number, transmitted precoding matrix indicator (TPMI), precoding matrix indicator (PMI) confirmation, etc.

Generally, a DCI format capable of being transmitted to the UE may be changed according to a UE-configured transmission mode TM. In other words, for a UE configured in a specific transmission (Tx) mode, instead of all DCI formats, only some DCI format(s) corresponding to the specific Tx mode can be used.

PDCCH is transmitted on a control channel element (CCE) or an aggregate (or aggregation) of contiguous CCEs. CCE is a logical assignment unit used to provide a coding rate based on a wireless channel status to PDCCH. CCE corresponds to a plurality of resource element groups (REGs). For example, one CCE corresponds to nine REGs, and one REG corresponds to four REs. In case of the 3GPP LTE system, a CCE set in which PDCCH can be located for each UE is defined. A CCE set from which a UE can find its own PDCCH is referred to as a PDCCH search space or simply a search space (SS). An individual resource, to which PDCCH can be transmitted in the search space, is referred to as a PDCCH candidate. A set of PDCCH candidates to be monitored by a UE is defined as a search space. In a 3GPP LTE/LTE-A system, search spaces for respective DCI formats may have different sizes. A dedicated search space and a common search space are defined in the 3GPP LTE/LTE-A system. The dedicated search space is a UE-specific search space, and is configured for each UE. The common search space is configured for a plurality of UEs. One PDCCH candidate corresponds to one, two, four, or eight CCEs according to a CCE aggregation level. The eNB or BS transmits real PDCCH (DCI) on an arbitrary PDCCH candidate in a search space, and UE monitors the search space to find the PDCCH (DCI). Monitoring means attempt to decode individual PDCCH in a corresponding search space according to all monitored DCI formats. A UE may monitor a plurality of PDCCHs to detect its own PDCCH. Because a UE does not basically know a position from which its own PDCCH is transmitted, the UE attempts to decode all PDCCHs of a corresponding DCI format every subframe until the UE detects a PDCCH having an identifier thereof. This procedure is referred to as blind decoding (BD).

The eNB or BS may transmit data for a UE or a UE group through a data region. Data transmitted through the data region may also be referred to as user data. To transmit user data, a Physical Downlink Shared CHannel (PDSCH) may be assigned to the data region. A Paging channel (PCH) and a Downlink-shared channel (DL-SCH) are transmitted through a PDSCH. A UE may decode control information transmitted through a PDCCH to read data transmitted through a PDSCH. Information regarding which UE or UE group is used as a transmission destination of PDSCH data, or information regarding how the UE or UE group receives and decodes PDSCH data is contained in PDCCH, so that the resultant PDCCH is transmitted. For example, it is assumed that a specific PDCCH is Cyclic redundancy check (CRC) masked with a Radio Network Temporary Identity (RNTI) of "A", and information regarding data transmitted using radio resources (for example, frequency position) of "B" and transmission format information (for example, transmission block size, modulation scheme, coding information, etc.) of "C" is transmitted through a specific DL subframe. A UE monitors PDCCH using its own RNTI information. A UE having an RNTI of "A" detects PDCCH, and receives PDSCH indicated by "B" and "C" through information of the received PDCCH.

In order to demodulate signals received from the eNB by the UE, the UE needs to use a reference signal (RS) to be compared with a data signal. The reference signal (RS) may refer to a predefined special waveform signal known to the eNB and the UE, and may be transmitted from the eNB to the UE or from the UE to the eNB. If necessary, the RS may also be referred to as a pilot. Reference signals (RSs) are classified into a cell-specific RS commonly used for all UEs of a cell and a demodulation RS (DM RS) dedicated for a specific UE. DM RS transmitted from the eNB to demodulate DL data for a specific UE may also be referred to as a UE-specific RS. Although DM RS and CRS may be simultaneously transmitted on downlink, it should be noted that only one of the DM RS and the CRS may be transmitted as necessary. Assuming that only DM RS other than CRS is transmitted on downlink, a DM RS transmitted using the same precoder as in data may be used only for demodulation, such that a channel measurement RS must be provided separately. For example, in order to measure channel state information by the UE in 3GPP LTE(-A), CSI-RS acting as the additional measurement RS is transmitted to the UE. CSI-RS has a relatively low time-variation level in channel state information, such that the CSI-RS is transmitted at intervals of a predetermined time composed of a plurality of subframes in a different way from the CRS transmitted per subframe.

Figure 4:
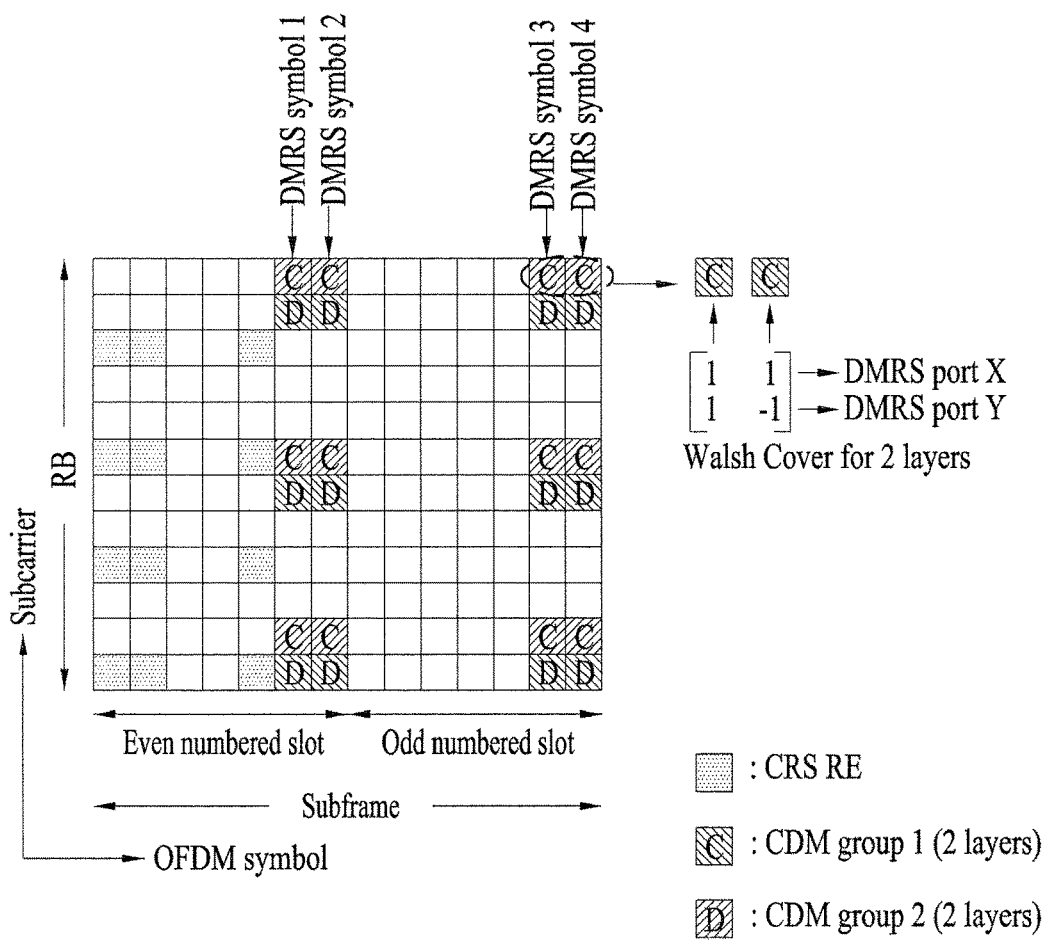
FIGS. 4 and 5 illustrate Cell-specific Reference Signal (CRS) time-frequency resources and Demodulation Reference Signal (DM RS) time-frequency resources in one resource block pair of a normal downlink subframe having a normal Cyclic Prefix (CP)
Figure 5:
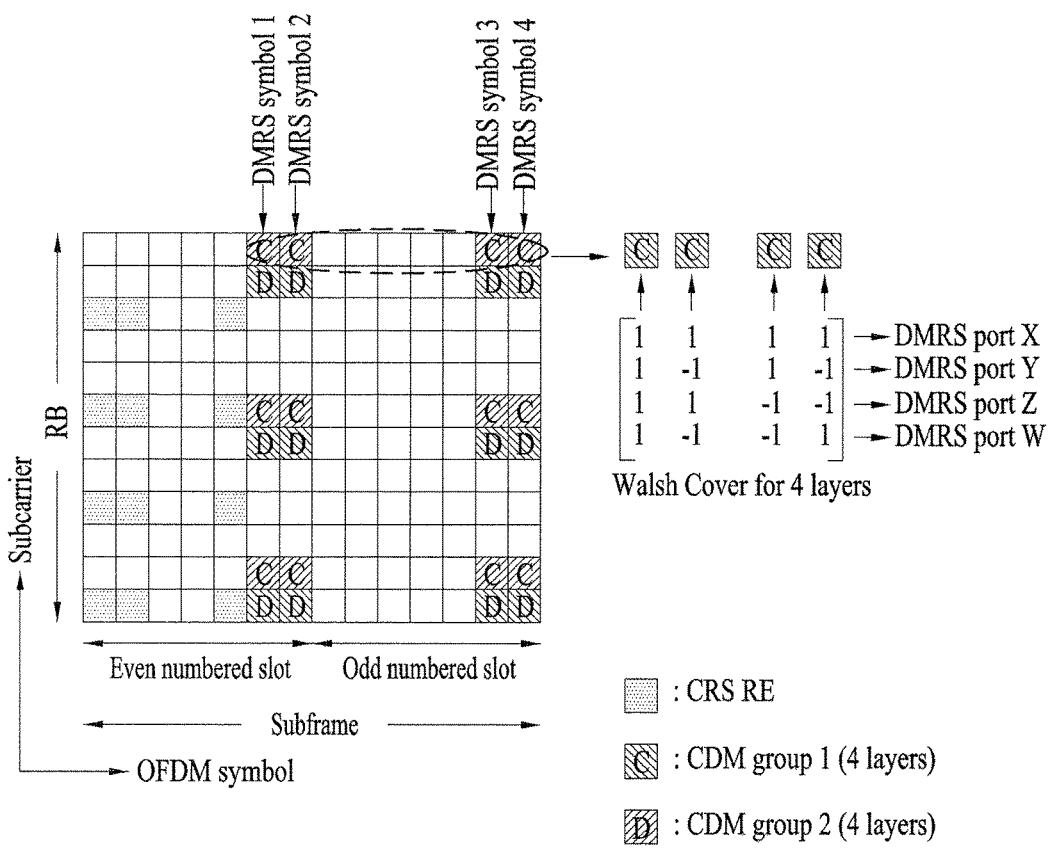

FIGS. 4 and 5 illustrate CRS time-frequency resources and DM RS time-frequency resources in one resource block pair of a normal downlink subframe having a normal CP. Specifically, FIG. 4 illustrates a method for multiplexing up to 4 DM RSs into 2 CDM groups, and FIG. 5 illustrates a method for multiplexing up to 8 DM RSs into 2 CDM groups.

Referring to FIGS. 4 and 5, in a 3GPP LTE(-A) system, a DM RS is defined by a PRB pair. Hereinafter, among REs of one PRB pair, a collection of REs for transmitting DM RSs extended by an orthogonal cover code to be distinguishable from each other is referred to as a Code Division Multiplexing (CDM) group. An example of the orthogonal cover code is the Walsh-Hadamard code. The orthogonal cover code is also referred to as an orthogonal sequence. Referring to FIGS. 4 and 5, for example, REs marked 'C' belong to one CDM group (hereinafter referred to as CDM group 1), and REs marked 'ID' belong to the other CDM group (hereinafter referred to as CDM group 2).

In the 3GPP LTE(-A) system, a plurality of layers of a downlink or uplink subframe may be multiplexed and transmitted to a receiver. In the present invention, the layer refers to an input path of information transmitted from a transmitter to a layer precoder and may also be referred to as a transmission layer, a stream, a transmission stream, a data stream or the like. Transmitted data is mapped to one or more layers. Accordingly, data is transmitted from the transmitter to the receiver via one or more layers. In the case of multilayer transmission, the transmitter transmits a DM RS per layer, and the number of DM RSs increases in proportion to the number of transmitted layers.

One antenna port may transmit one layer and one DM RS. When the transmitter needs to transmit 8 layers, up to 4 antenna ports may transmit 4 DM RSs using one CDM group. For example, referring to FIG. 5, DM RS port X, DM RS port Y, DM RS port Z and DM RS port W may respectively transmit 4 DM RSs spread by different orthogonal sequences, using the same CDM group. Using orthogonal sequences used to multiplex corresponding DM RSs to sequential 4 DM RS RE in an OFDM symbol direction, the receiver may detect the corresponding DM RSs from signals received through the sequential 4 DM RS REs.

The DM RS is generated using a physical layer cell identity $N_{ID}^{cell}$ as a seed. For example, for antenna ports $p \in \{7, 8, \ldots, \gamma+6\}$, the DM RS may be defined by Equation 1.

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \cdots, 12N_{RB}^{max,DL} - 1 & \text{normal cyclic prefix} \\ 0, 1, \cdots, 16N_{RB}^{max,DL} - 1 & \text{extended cyclic prefix} \end{cases}$$

[Equation 1]

In Equation 1, $N_{RB}^{max,DL}$ denotes the largest downlink bandwidth component and expressed as an integer multiple of $N_{RB}^{sc}$. A pseudo-random sequence c(i) may be defined by a length-31 gold sequence. A length-$M_{PN}$ output sequence c(n) (where n=0, 1, . . . , $M_{PN}$−1) is defined by Equation 2.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

[Equation 2]

In Equation 2, $N_C=1600$ and the first m-sequence is initialized to $x_1(0)=1$, $x_1(n)=0$, n=1, 2, . . . , 30. Initialization of the second m-sequence is expressed as Equation 3 having a value dependent upon application of the sequence.

$$c_{init} = \Sigma_{i=0}^{30} x_2(i) \cdot 2^i$$

[Equation 3]

In the case of Equation 1, a pseudo-random sequence generator is initialized at the start of each subframe by Equation 4.

$$c_{init} = (\lfloor n_S/2 \rfloor + 1) \cdot (2N_{ID}^{cell} + 1) \cdot 2^{16} + n_{SCID}$$

[Equation 4]

In Equation 4, the value of nSCID is 0 unless specified otherwise. For PDSCH transmission through antenna port 7 or 8, nSCID is given by DCI format 2B or 2C associated with the PDSCH transmission. DCI format 2B is a DCI format for resource assignment for a PDSCH using up to 2 antenna ports having DM RSs, and DCI format 2C is a DCI format for resource assignment for a PDSCH using up to 8 antenna ports having DM RSs. Here, nSCID may be indicated by a scrambling identity field according to Table 3 in the case of DCI format 2B, and may be given according to Table 4 in the case of DCI format 2C.

TABLE 3

| Scrambling identity field in DCI format 2B | $n_{SCID}$ |
|---|---|
| 0 | 0 |
| 1 | 1 |

TABLE 4

| One Codeword: Codeword 0 enabled Codeword 1 disabled | | Two Codewords: Codeword 0 enabled Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Figure 6:
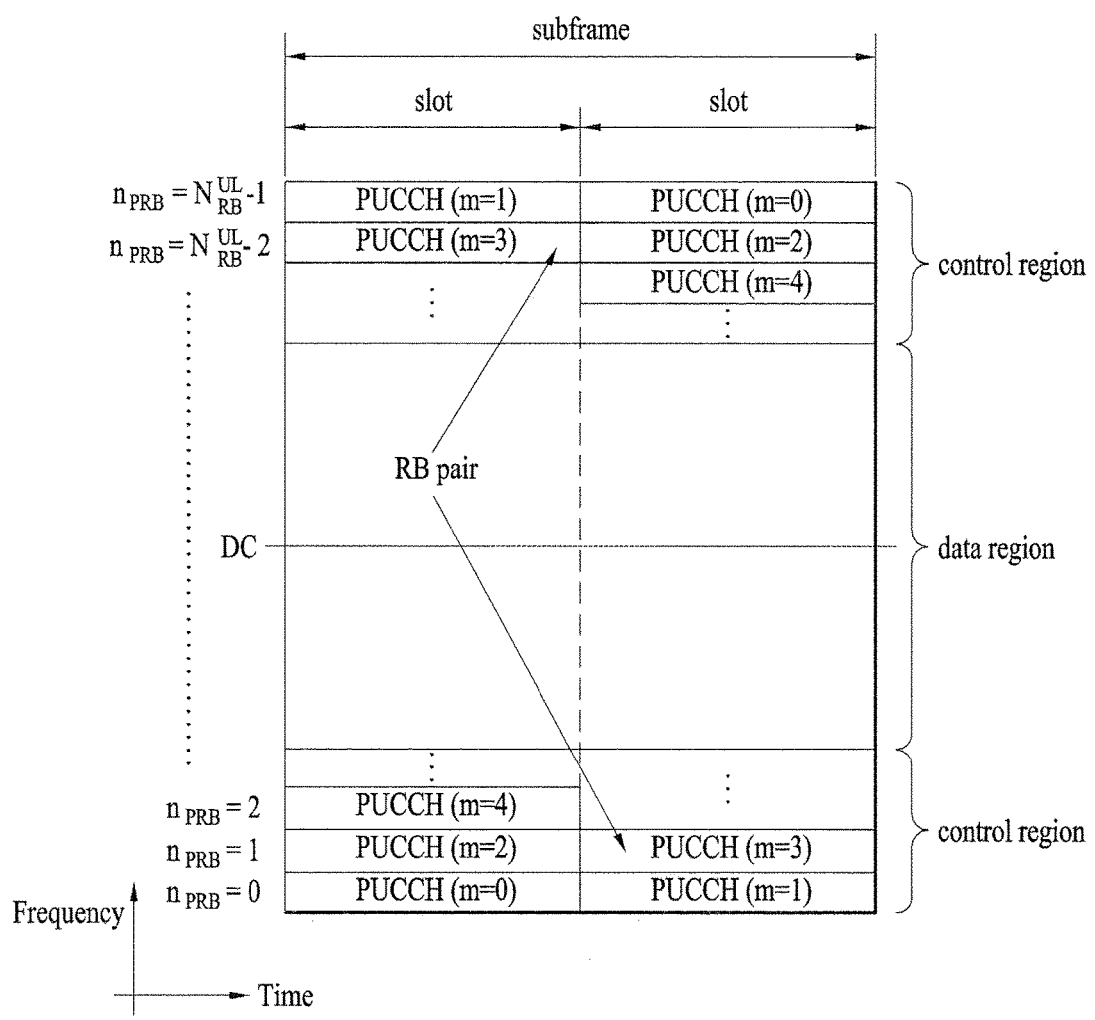
FIG. 6 illustrates an exemplary structure of a UL subframe in a 3GPP LTE/LTE-A system.

FIG. 6 illustrates an exemplary structure of a UL subframe in a 3GPP LTE/LTE-A system.

Referring to FIG. 6, a UL subframe can be divided into a control region and a data region in the frequency domain. One or more Physical Uplink Control Channels (PUCCHs) can be allocated to the control region to carry Uplink Control Information (UCI). One or more Physical Uplink Shared Channels (PUSCHs) may be allocated to the data region of the UL subframe to carry user data.

In the UL subframe, subcarriers away from a Direct Current (DC) subcarrier are used as the control region. In other words, subcarriers located at two ends of a UL transmission bandwidth are assigned to UCI transmission. The DC subcarrier is a remaining component not used for signal transmission and is mapped to carrier frequency f0 during frequency up-conversion. A PUCCH for a single UE is allocated to an RB pair belonging to resources operating at a carrier frequency in a subframe and RBs belonging to the RB pair occupy different subcarriers in two slots. Assignment of the PUCCH in this manner is represented as frequency hopping of an RB pair allocated to the PUCCH at a slot boundary. When frequency hopping is not used, the RB pair occupies the same subcarrier.

The PUCCH can be used to transmit control information described below.

SR (Scheduling Request): Information used to request a UL-SCH resource and is transmitted using On-Off Keying (OOK) scheme.

HARQ-ACK: Response to a PDCCH and/or a downlink data packet (e.g., codeword) on a PDSCH and indicates whether the PDCCH or PDSCH has been successfully received. A 1-bit HARQ-ACK signal is transmitted as a response to a single downlink codeword and a 2-bit HARQ-ACK signal is transmitted as a response to two downlink codewords. The HARQ-ACK response includes positive ACK (simply, ACK), negative ACK (NACK), Discontinuous Transmission (DTX) or NACK/DTX. Here, the term HARQ-ACK is used interchangeably with the terms HARQ ACK/NACK and ACK/NACK.

Channel State Information (CSI): Feedback information about a downlink channel. Multiple Input Multiple Output (MIMO)-related feedback information includes a Rank Indicator (RI) and a Precoding Matrix Indicator (PMI).

The amount of Uplink Control Information (UCI) that a UE can transmit in a subframe depends on the number of SC-FDMA symbols available for control information transmission. The SC-FDMA symbols available for control information transmission refer to SC-FDMA symbols other than SC-FDMA symbols for reference signal transmission in the subframe. In the case of a subframe in which a Sounding Reference Signal (SRS) is configured, the last SC-FDMA symbol of the subframe is excluded from the SC-FDMA symbols available for control information transmission. A reference signal is used for coherent detection of the PUCCH. The PUCCH supports various formats base on information transmitted thereon.

Table 5 shows mapping relations between PUCCH formats and UCI in an LTE/LTE-A system.

TABLE 5

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |

TABLE 5-continued

| PUCCH format | Modulation scheme | Number of bits per subframe, $M_{bit}$ | Usage | Etc. |
| --- | --- | --- | --- | --- |
| 3 | QPSK | 48 | ACK/NACK or SR + ACK/NACK or CQI/PMI/RI + ACK/NACK | |

Referring to Table 5, PUCCH format 1 series are mainly used to transmit ACK/NACK information, PUCCH format 2 series are mainly used to Channel State Information (CSI) such as CQI/PMI/RI, and PUCCH format 3 series are mainly used to transmit ACK/NACK information.

Referring to Equations 1 to 4, in the case of downlink, an eNB uses the same physical layer cell identity $N_{ID}^{cell}$ for all UEs to generate a DM-RS to be transmitted to a specific cell. According to the current 3GPP LTE(-A) system, since one UE receives downlink signals from only one cell, the UE should know only one $N_{ID}^{cell}$ and one nSCID to detect a DM-RS thereof. Meanwhile, referring to Equation 4, UEs located in one cell initializes a pseudo-random sequence generator for generating an RS sequence, using the same $N_{ID}^{cell}$. In view of one UE, since the UE receives downlink signals from only one cell, the UE uses only one $N_{ID}^{cell}$ to generate a DM-RS. That is, in a legacy system, since a UE receives downlink signals from only one cell, a cell (DL)-based DM-RS sequence has been used. In other words, in the legacy communication system, since a downlink cell and a uplink cell correspond to the same cell and one cell performs both uplink/downlink transmission, the UE may acquire $N_{ID}^{cell}$ based on downlink synchronization signals received from a serving cell, e.g., a Primary Synchronization Signal (PSS) and a Secondary cell Synchronization Signal (SSS), and use the acquired $N_{ID}^{cell}$ to generate an uplink/downlink RS sequence.

However, in DL CoMP, a plurality of cells or Transmission Points (TPs) may simultaneously participate in transmitting downlink signals to one UE, or the cells or TPs may selectively transmit downlink signals to the UE. For example, one of 2 points may perform downlink data transmission (e.g., PDSCH transmission) and the other point may not perform transmission (in the case of CB/CS or DPS). As another example, both of 2 points may perform downlink data transmission (in the case of JT). Furthermore, in UL CoMP, one UE may perform uplink transmission toward a plurality of cells or Reception Points (RPs), or may perform uplink transmission toward a part of the cells or RPs. In this case, if a transmitter transmits an RS sequence generated based on $N_{ID}^{cell}$ of a legacy serving cell using the legacy scheme, a receiver may not detect the corresponding RS sequence in some cases.

In Equation 1, $N_{ID}^{cell}$ denotes a variable for achieving interference randomization by assigning different DM-RS sequences to neighboring cells using cell IDs, and $n_s$ denotes a variable for randomizing correlation with a neighboring cell DM-RS sequence using slot numbers in one radio frame. Furthermore, nSCID denotes a variable for quasi-orthogonally supporting up to 2 UEs other than 2 UEs capable of MU-MIMO through an Orthogonal Cover Code (OCC) following the Walsh code in the same cell. However, LTE-A currently considers assignment of DM-RS sequences, which are not defined in a cell specific manner, to support CoMP. For example, an environment in which the same Physical Cell ID (PCID) is shared by a single eNB (e.g., eNB1) and multiple Transmission Points (TPs) (e.g., TP1 and TP2) as illustrated in FIG. 7 (e.g., CoMP scenario 4) can be considered.

Figure 7:
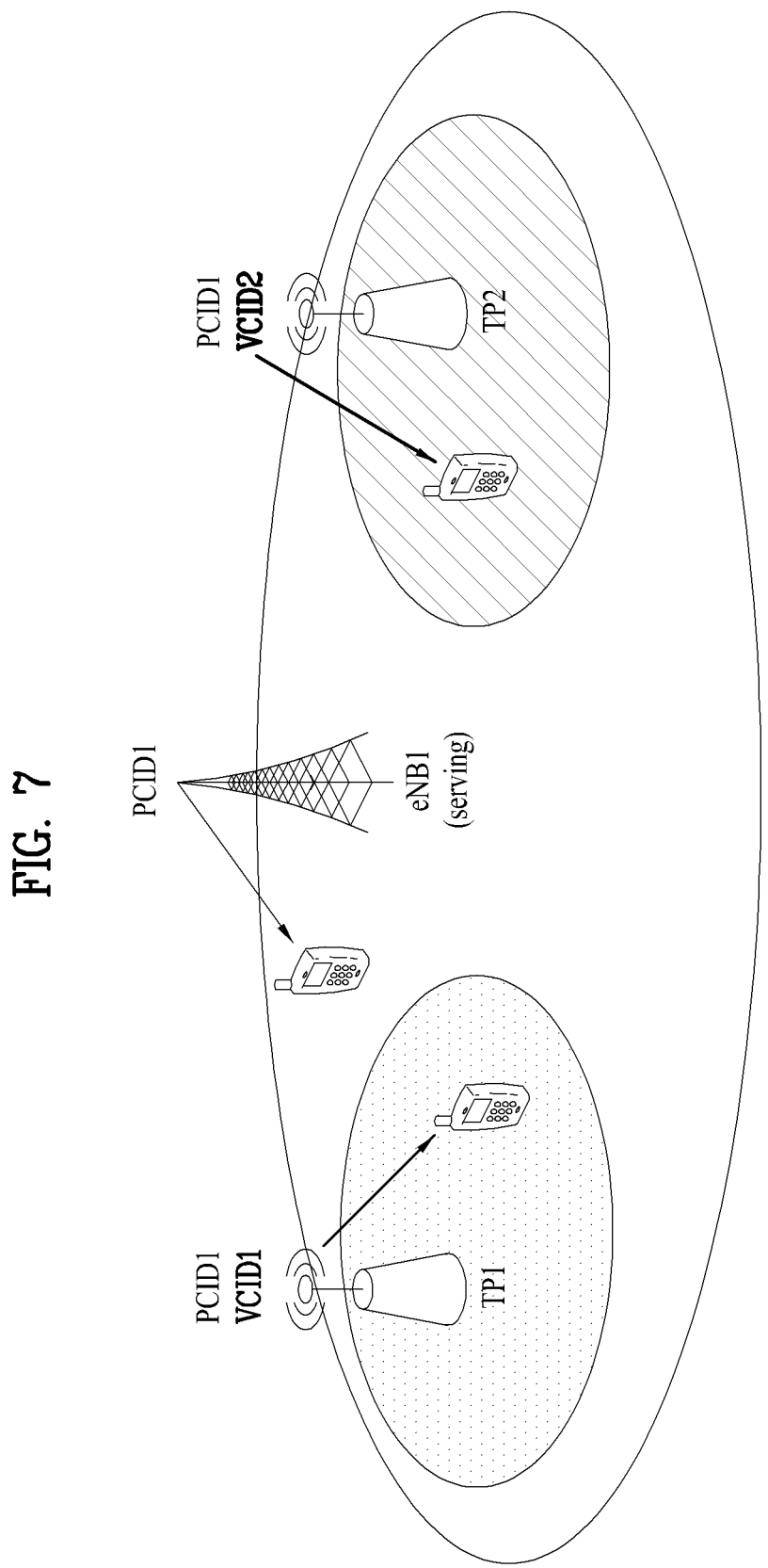
FIG. 7 illustrates Coordinated Multiple Point transmission and reception (CoMP) operation related to an embodiment of the present invention.
Figure 8:
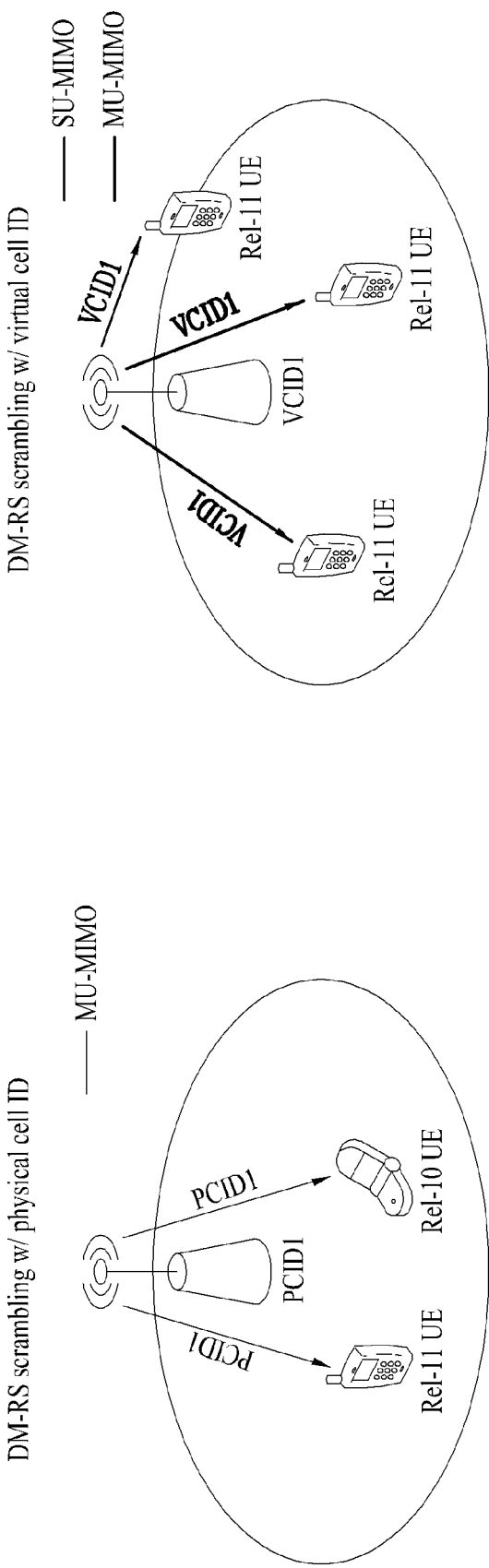
FIG. 8 illustrates CoMP operation related to another embodiment of the present invention.

In the environment of FIG. 7, each TP should perform localized transmission to achieve a cell splitting gain and, in this case, a necessity of using different DM-RS sequences occurs for interference randomization between DM-RSs transmitted from respective TPs. To satisfy this necessary, LTE Rel-11 considers defining an initial value of a DM-RS sequence in the form of a TP-specific Virtual Cell ID (VCID). In the above CoMP environment, a UE should be able to use a PCID based DM-RS sequence for scheduling with legacy LTE Rel-10 UEs, or use a VCID based DM-RS sequence for scheduling with LTE Rel-11 UEs. Assignment of the DM-RS sequence should be dynamically supported in synchronization with a scheduling period. FIG. 8 illustrates the above operation.

To support dynamic DM-RS sequence assignment, a method for signaling a candidate list of DM-RS sequence initial values (these values actually are initial values of a pseudo-random sequence for generating a DM-RS sequence but are simply referred to as the "DM-RS sequence initial values" in this specification) to a UE through higher layer signaling, e.g., RRC signaling, to select a specific DM-RS sequence initial value in the candidate list based on legacy Scrambling Identity (SCID) information or additional bit information of DCI may be considered. For example, in an environment in which PCID1 is selected as an initial value for scheduling with LTE Rel-10 UEs and VCID1 is selected as an initial value for scheduling with LTE Rel-11 UEs as illustrated in FIG. 8, a candidate list of DM-RS sequence initial values may be defined as {PCID1, VCID1} through RRC signaling. In this case, PCID1 may be selected if SCID or additional 1-bit information of DCI indicates '0' and VCID1 may be selected if the corresponding SCID or the 1-bit information indicates '1'. However, if a representative CoMP scheme, Dynamic Point Selection (DPS) is used in the above example, the SCID or the 1-bit information cannot indicate a specific DM-RS sequence initial value. The number of dynamically assignable DM-RS sequences in the DPS scheme is proportional to the number of dynamically selectable TPs. If the number of TPs increases and thus the size of the DM-RS sequence candidate list is 3 or above, a DM-RS sequence not selectable using the 1-bit information of the above example may occur.

Figure 9:
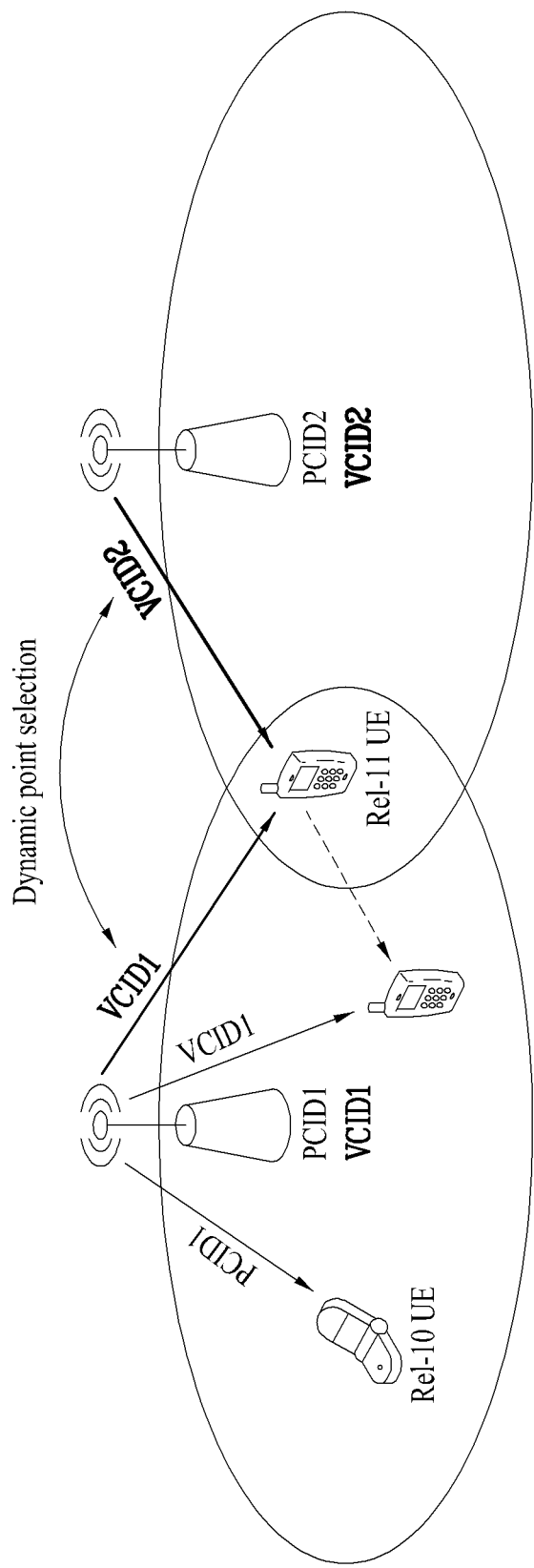
FIG. 9 illustrates CoMP operation related to another embodiment of the present invention.

Alternatively, as illustrated in FIG. 9, when the number of TPs for DPS is 2 in a CoMP environment in which an eNB and TPs use the same PCID1 (e.g., CoMP scenario 4), if the TPs use different VCID (e.g., VCID1, VCID2) based DM-RS sequences for interference randomization with the eNB and use a PCID (e.g., PCID1) based DM-RS sequence for scheduling with a Rel-10 UE, a candidate list of DM-RS sequences for an LTE Rel-11 UE which performs the DPS operation should be {PCID1, VCID1, VCID2}, which cannot be indicated using 1 bit.

Meanwhile, LTE defines transmission modes for supporting a variety of MIMO schemes to transmit user data in a PDSCH region. For example, in LTE Rel-10, TM1 and TM2 refer to a single antenna scheme and a transmit diversity scheme, respectively, and TM3 to TM9 are defined as shown in the table below.

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |

TABLE 6-continued

| Transmission mode | DCI format | Search Space | Transmission scheme of PDSCH corresponding to PDCCH |
|---|---|---|---|
| | DCI format 2C | UE specific by C-RNTI | Up to 8 layer transmission, ports 7-14 or single-antenna port, port 7 or 8 |

In this case, each transmission mode includes a DCI format for supporting an MIMO scheme supported by the corresponding transmission mode, and a DCI format for fall back operation for a case in which the MIMO scheme is not supportable. Accordingly, a UE initially searches a PDCCH region for a DCI format for an MIMO scheme supported by a transmission mode. If the corresponding DCI format is not present, the UE searches for a DCI format for fall back operation to perform the fall back operation. Here, the PDCCH is transmitted using one or more Control Channel Elements (CCEs), and each CCE includes 9 Resource Element Groups (REGs). LTE is designed in such a manner that a UE considers only a restricted CCE set to reduce complexity of detecting control information thereof. This restricted CCE region is defined as a Search Space (SS) and has a different size according to each PDCCH format. Furthermore, the SS may be divided largely into a Common Search Space (CSS) and a UE-specific Search Space (USS). The CSS refers to a space commonly known by all UEs, and the USS refers to a space known only by a specific UE. However, in this case, the CSS may overlap with the USS.

Figure 10:
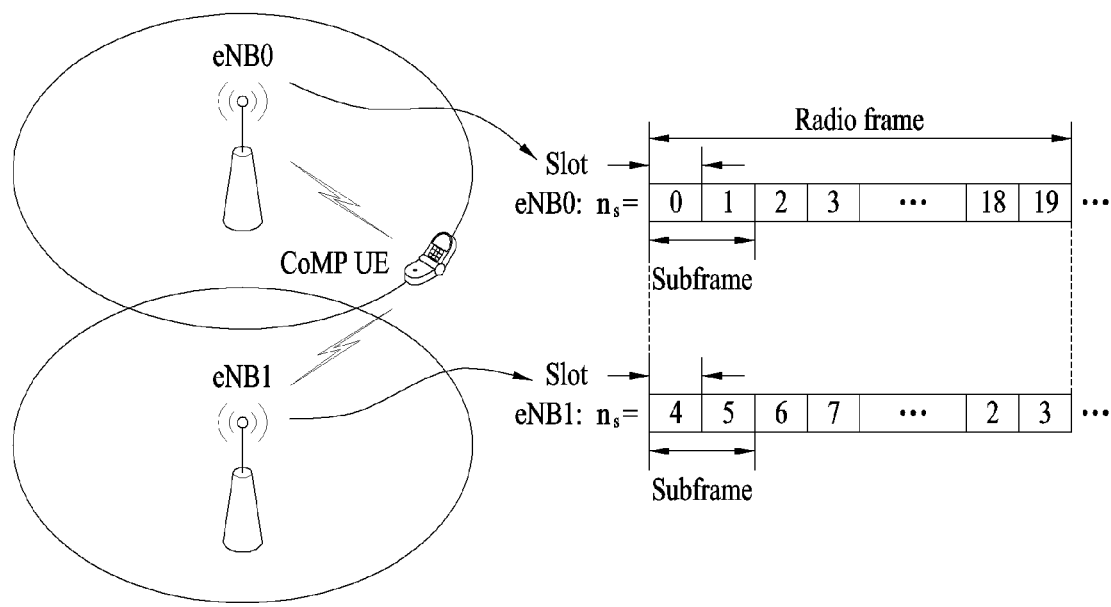
FIG. 10 illustrates a problem caused by CoMP.

FIG. 10 illustrates a problem which can be caused by RS sequence detection in DL CoMP or UL CoMP. This problem can be caused not only when an RS sequence is detected by a receiver of an RS but also when a sequence for uplink data or a control signal is generated. Specifically, embodiments of the present invention relate to downlink DMRS, uplink DMRS, SRS, PUSCH and PUCCH associated with CoMP, and more signals or channels may be related to embodiments of the present invention.

In FIG. 10, eNB0, eNB1, and a CoMP UE perform CoMP transmission and reception. Although only two eNBs are illustrated for convenience of explanation, a larger number of eNBs may be included. Here, eNB0 is referred to as a first TP, eNB1 is referred to as a second TP, and a serving cell of the CoMP UE is assumed as the first TP. A case in which a slot number $n_{s1}$ of a radio frame of the first TP is different from a slot number $n_{s2}$ of a radio frame of the second TP at the same timing for any reason is also assumed.

For example, the $n_{s1}$ value may differ from the $n_{s2}$ value at a specific timing due to the communication network configuration. That is, for a specific reason, t the $n_{s1}$ value and the $n_{s2}$ value may have a certain offset therebetween. As another example, in enhanced Inter-Cell Interference Coordination (eICIC), an offset may be intentionally given to achieve different slot numbers between at least two adjacent cells not to transmit a special signal and a channel, which are transmitted only at specific slot numbers (or indices), e.g., PSS/SSS and PBCH, at the same slot number by the at least two cells. That is, in eICIC, to perform time-domain interference coordination, specific subframes may be configured as Almost Blank Subframes (ABSs) or reduced power ABSs (r-ABSs) based on a predefined subframe bitmap pattern and thus the offset may be set to provide minimum interference to the PSS/SSS and the PBCH. The above reason is merely exemplary and there may be other reasons for the different in slot numbers of radio frames between at least two TPs at a specific timing.

Due to the above-described CoMP characteristics, different $N_{ID}^{cell}$ values of multiple TPs/RPs and the difference in slot numbers between TPs/RPs may cause an error when an RS sequence is generated or detected, when a sequence for a UL data signal or a UL control signal is generated or detected, or when frequency hopping is performed in CoMP operation.

Accordingly, for CoMP in which a plurality of cells or a plurality of TPs/RPs participate in communication with a UE, although different points do not simultaneously transmit or receive data, methods for generating and transmitting DM RSs for data to be transmitted from/to the different points need to be defined. One TP may transmit a downlink signal to a UE through one or more cells while one RP may receive an uplink signal from a UE through one or more cells. Hereinafter, for convenience of explanation, the cells for transmitting the downlink signal are collectively referred to as TPs and the cells for receiving the uplink signal are collectively referred to as RPs to describe embodiments of the present invention. In this specification, the difference in slot numbers between eNBs, between TPs/RPs, and/or between cells refers to the difference in radio frame slot numbers between at least two eNBs, TPs/RPs, and/or cells at the same timing or at a specific timing. For brevity of explanation, this difference can be simply referred to as the "difference in slot numbers (slot number difference value)" or a "slot number offset" without mentioning the same timing or a specific timing.

When one of two TPs having different cell IDs selectively transmits data to a UE or when the UE selectively transmits data to one of two RPs having different cell IDs, the present invention proposes to generate and transmit a UE-specific (e.g., downlink) DM RS sequence based on the cell ID ($N_{ID}^{cell}$) designated to each TP/RP. Furthermore, the present invention proposes to generate and transmit a UE-specific (e.g., downlink) DM RS sequence based on the difference in slot number between TPs/RPs at the same timing or at a specific timing. The UE demodulates PDSCH data received from each point using the downlink DM RS sequences from the different TPs. The UE may acquire $N_{ID}^{cell}$ of a specific cell using a downlink synchronization signal of the specific cell, but may not cell acquire $N_{ID}^{cell}$ of a cell other than the specific cell. Thus, according to an embodiment of the present invention, an eNB signals a cell ID to be used by the UE for downlink RS sequence generation or resource mapping, through higher layer signaling. The cell ID may be an ID of a cell associated with the downlink RS or the downlink signal, or a virtual ID.

In addition, the UE may acquire a radio frame slot number $n_s$ of a specific cell using a downlink synchronization signal of the specific cell, but may not acquire $n_s$ of a cell other than the specific cell. Furthermore, although $n_s$ of a downlink cell is acquired using a downlink synchronization signal, the UE may not acquire $n_s$ of an uplink cell if the downlink cell differs from the uplink cell. Thus, according to an embodiment of the present invention, an eNB signals a plurality of $n_s$ values to be used for uplink/downlink RS sequence generation and sequence generation for an uplink signal or resource mapping, or information about the $n_s$ values to the UE through higher layer signaling. Here, the eNB may be a serving cell of the UE. However, the scope of the present invention is not limited thereto. For example, the eNB may quasi-statically signal a cell ID and/or a scrambling ID, $n_s$ and/or $\Delta n_s$ corresponding to a $n_s$ difference value between eNBs (hereinafter referred to as "$n_s$ information") in pairs, i.e., in the form of {cell ID/scrambling ID, $n_s/\Delta n_s$} to the UE through RRC signaling. Alternatively, the eNB may quasi-statically signal a plurality of pairs of a plurality of cell IDs and/or scrambling IDs, and a plurality of $n_s$ information to the UE through RRC signaling, and dynamically signal an ID to be used at a corresponding transmission/reception timing among the signaled IDs to the UE using DCI transmitted on a PDCCH. In the case of downlink, the eNB may dynamically indicate a cell ID and/or $n_s$ information associated with a PDSCH using DCI, and transmit a downlink DM RS sequence generated using the cell ID and/or the $n_s$ information to the UE through a corresponding point together with data. The UE may know of a downlink DM RS sequence to be received, based on the indicated ID and/or the $n_s$ information. Accordingly, the UE may detect a downlink DM RS sequence associated with downlink data, and may demodulate the downlink data using the downlink DM RS. In the case of uplink, the UE may receive an ID and/or $n_s$ information to be used for uplink RS sequence generation, through DCI, and generate an uplink RS sequence using the received ID and/or the $n_s$ information to transmit the uplink RS sequence to the eNB. The eNB knows of an ID to be used by the UE to generate the uplink RS sequence, and thus may effectively detect the uplink RS sequence. The eNB may demodulate UCI and/or PDSCH data received from the UE through a corresponding point using the uplink RS sequence.

Here, the $n_s$ information includes $n_s$ of a specific cell and/or $\Delta n_s$ corresponding to a $n_s$ difference value between eNBs. That is, the $n_s$ information may include a slot number $n'_s$ of a cell other than a legacy serving cell for communication between TPs/RPs which participate in CoMP, or include a difference value or an offset between $n_s$ of the serving cell and $n'_s$ of the cell other than the serving cell. In LTE(-A), since one radio frame includes a total of 20 slots, a slot number $n_s$ of the radio frame corresponds to one of 0 to 19 (see FIG. 1). Accordingly, if $n_s$ of the serving cell differs from $n'_s$ of the cell other than the serving cell by an integer of 4, this corresponds to $\Delta n_s=4$ and $n'_s$ of the cell other than the serving cell may be expressed as Equation 5.

$$n'_s = \mathrm{mod}(n_s + \Delta n_s, 20) \quad \text{[Equation 5]}$$

That is, an ID/scrambling ID of a cell associated with a channel or a signal to be used for CoMP communication may be used instead of $N_{ID}^{cell}$, and $\mathrm{mod}(n_s+\Delta n_s, 20)$ may be used instead of $n_s$. Accordingly, Equation 4 may be modified into Equation 6.

$$c_{init} = (\lfloor \mathrm{mod}\{(n_s+\Delta n_s), 20\}/2 \rfloor + 1) \cdot (2N_{ID}^{(DMRS)}+1) \cdot 2^{16} + n_{SCID} \quad \text{[Equation 6]}$$

The $N_{ID}^{(DMRS)}$ value is the same as $N_{ID}^{cell}$ of Equation 4, but particularly expressed as $N_{ID}^{(DMRS)}$ because this value indicates a cell identity for a DMRS sequence.

Meanwhile, in the case of CoMP JT and CoMP JR, a point for transmitting a downlink signal (hereinafter referred to as a downlink serving point) may differ from a point for receiving an uplink signal (hereinafter referred to as an uplink serving point). Furthermore, a plurality of points may participate in downlink transmission or a plurality of points may participate in uplink reception. Accordingly, a system needs to be designed in consideration of this.

According to an embodiment of the present invention, for dynamical DMRS sequence assignment, a method for providing a set of parameters for DMRS sequence assignment to a UE through higher layer signaling. That is, for example, a "DMRS configuration parameter set" may be provided through higher layer signaling and the "DMRS configuration parameter set" may be in the form of a set of information or parameters described below.

Candidate value of DM-RS sequence initial value (i.e., cell identity and denoted by $x(n)(0 \leq n < N)$ in this specification)

nSCID (e.g., 0 or 1)

$n_s$ information (i.e., $\Delta n_s$)

Other parameter(s) to be used for DM-RS sequence generation and UE-specifically set In this specification, the "DMRS configuration parameter set" is simply referred to as "SC_config". For example, SC_config0={x(0), nSCID=0, $\Delta n_s$=0}, SC_config1={x(1), nSCID=1, $\Delta n_s$=4}, etc. may be UE-specifically provided through higher layer signaling.

As another example, SC_config0={x(0), nSCID=0, $\Delta n_s$=2}, SC_config1={x(1), nSCID=0, $\Delta n_s$=8}, etc. may be UE-specifically provided through higher layer signaling. In this case, SC_config0 and SC_config1 are set to use the same nSCID. In other words, the cell identity may be dynamically switched because each SC_config has a different candidate value of the DMRS sequence initial value, and different SC_configs are set to have the same nSCID for flexible Multi-User (MU) paring with other UEs configured with a specific nSCID value using DCI format 2C.

As another example, SC_config0={x(0), nSCID=1, $\Delta n_s$=0}, SC_config1={x(1), nSCID=1, $\Delta n_s$=4}, etc. may be UE-specifically provided through higher layer signaling.

As another example, SC_config0={x(0), nSCID=1}, SC_config1={x(1), nSCID=1}, etc. may be UE-specifically provided through higher layer signaling, and $\Delta n_s$ may not be included in these SC_configs.

As described above, according to an embodiment of the present invention, the "DMRS configuration parameter set" may be configured as an arbitrary combination of parameters such as x(n), nSCID and $\Delta n_s$. Furthermore, as necessary, a specific restriction may be given to the DMRS configuration parameter set. In addition, the range of values of each parameter has no restriction. For example, nSCID may be equal to or greater than 2.

Alternatively, SC_config0={x(0), nSCID=0} and SC_config1={x(1), nSCID=y} may be set. In this case, x(n) values of the SC_configs may be signaled to a UE and the value y may be determined based on relations between x(0) and x(1). For example, the value y is determined as described below.

(i) y=0, if $x(0) \neq x(1)$ (ii) y=1, otherwise

For example, if x(0) and x(1) are set to different values, SC_config0={x(0), nSCID=0} and SC_config1={x(1), nSCID=0}. Specifically, if x(0) and x(1) for a corresponding CoMP UE (a UE configured to support CoMP operation) are set to different values, this means that DL-CoMP transmission through Dynamic Point Selection (DPS) may be scheduled from different transmission points. That is, referring to FIG. 9, since a Rel-11 UE located in a region where the coverage of TP1 having $PCID_1$ overlaps with the coverage of TP2 having $PCID_2$ can receive downlink signals from TP1 and the TP2 based on DL-CoMP operation, at least 2 SC_configs may be signaled to the Rel-11 UE and x(n) values of the SC_configs may be set differently. In this case, complete orthogonality between CoMP UEs through different antenna ports (e.g., ports 7 and 8) may be ensured by setting nSCID values of the SC_configs commonly to nSCID=0 for MU paring with another CoMP UE other than the Rel-11 UE.

As another example, if x(0) and x(1) are set to the same value, SC_config0={x(0), nSCID=0} and SC_config1={x (1)=x(0), nSCID=1}. Specifically, if x(0) and x(1) for a corresponding CoMP UE are set to the same value, channel state from one of a plurality of TPs is dominantly excellent and thus nSCID values of SC_config0 and SC_config1 may be set differently in such a manner that various types of MU paring with legacy UE(s) and CoMP UE(s) for receiving various services from the TP are appropriately achieved.

In these methods, by fixing at least x(0) to nSCID=0, nSCID=0 may be fixed similarly to legacy Rel-10 operation in higher rank states corresponding to values 4, 5, 6 and 7 of one codeword part (rank 2 or above, i.e., more than 2 layers) and values 2, 3, 4, 5, 6 and 7 of two codeword part (rank 3 or above, i.e., more than 3 layers), and DMRS sequence generation in the higher rank states using parameters in SC_config0 may be achieved.

In a different point of view, a UE may receive, for example, x(0) and x(1) through higher layer signaling (e.g., RRC signaling). In this case, if x(0)=x(1), Table 7 corresponding to DCI format 2C of Rel-10 is used without any change. However, only a PCID part of Rel-10 is replaced with x(0)=x(1), and x(0)=x(1) is used instead of PCID and nSCID=0 is used for higher rank states.

TABLE 7

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

If x(0)≠x(1) in this case, a UE may use Table 8 obtained by replacing all nSCID values with nSCID=0 in the table corresponding to DCI format 2C of Rel-10. Furthermore, x(0) or x(1) may be specifically used instead of PCID according to a predefined rule and nSCID=0 is always used for higher rank states. As such, when x(0)≠x(1), Table 8 may not be specifically necessary, and Table 7 corresponding to DCI format 2C of Rel-10 may be used by applying "nSCID=0" to all states.

TABLE 8

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 0$ | 1 | 2 layers, ports 7-8, $n_{SCID} = 0$ |
| 2 | 1 layer, port 8, $n_{SCID} = 0$ | 2 | 3 layers, ports 7-9 |
| 3 | 1 layer, port 8, $n_{SCID} = 0$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Alternatively, SC_config0={x(0), nSCID=0} and SC_config1={x(1), nSCID=0} may be set and nSCID=0 may be fixed irrespective of SC_config. This serves to ensure complete orthogonality between CoMP UEs through different antenna ports (e.g., ports 7 and 8) by setting nSCID values of the SC_configs commonly to nSCID=0 for appropriate MU paring between the CoMP UEs as described above, and to simplify parameter configuration rules.

In the above proposed methods, $\Delta n_s$ has been omitted. Similarly to the afore-described various embodiments, $\Delta n_s$ values may also be combined in various forms as necessary.

To dynamically switch the above SC_configs, an indication may be given by explicitly adding bit(s) to a specific DCI format, or an existing bit field of the specific DCI format may be reused. For example, in the case of DCI format 2C, a 3-bit table about SCID and space layer information may be modified and used as shown in the table below.

TABLE 9

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, SC_config0 | 0 | 2 layers, ports 7-8, SC_config0 |
| 1 | 1 layer, port 7, SC_config1 | 1 | 2 layers, ports 7-8, SC_config1 |
| 2 | 1 layer, port 8, SC_config0 | 2 | 3 layers, ports 7-9 |
| 3 | 1 layer, port 8, SC_config1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Table mapping rules may be determined as described below for higher rank states corresponding to values 4, 5, 6 and 7 of one codeword part (rank 2 or above, i.e., more than 2 layers) and values 2, 3, 4, 5, 6 and 7 of two codeword part (rank 3 or above, i.e., more than 3 layers:

(1) A corresponding table of Rel-10 may be used by always setting parameters such as PCID of a serving cell, nSCID=0 and $\Delta n_s$=0 for higher rank states. That is, although parameters set based on SC_config0 or SC_config1 of Table 9 through RRC signaling are dynamically indicated for other rank states, for example, a predefined PCID may be fixed to these higher rank states even when SC_config0 or SC_config1 does not include the PCID.

(2) Parameters of a predefined specific SC_config (e.g., SC_config0 or SC_config1) may always be used for higher rank states.

For example, if SC_config0={x(0), nSCID=0, $\Delta n_s$=0} is predefined for the higher rank states, when a dynamic indication of the higher rank states is given, SC_config0={x (0), nSCID=0, $\Delta n_s$=0} may always be used to generate a DMRS sequence.

Alternatively, for example, if SC_config1={x(1), nSCID=0, $\Delta n_s$=4} is predefined for the higher rank states, when a dynamic indication of the higher rank states is given, SC_config1={x(1), nSCID=0, $\Delta n_s$=4} may always be used to generate a DMRS sequence.

In this manner, a specific SC_config may be predefined for the higher rank states.

(3) Alternatively, a specific SC_config may be predefined for higher rank states as described above and, in this case, one or some parameters in the specific SC_config may always be fixed to specific value(s).

For example, an nSCID parameter in the SC_config may be predefined to always use nSCID=0 for the higher rank states irrespective of the SC_config. In this case, if SC_config0={x(0), nSCID=1, $\Delta n_s$=0} is predefined for the higher rank states, when a dynamic indication of the higher rank states is given, {x(0), $\Delta n_s$=0} of SC_config0 and nSCID=0 predefined irrespective of the SC_config may always be used to generate a DMRS sequence.

Otherwise, if SC_config1={x(1), nSCID=1, $\Delta n_s$=6} is predefined for the higher rank states, when a dynamic indication of the higher rank states is given, {x(1), $\Delta n_s$=6} of SC_config1 and nSCID=0 predefined irrespective of the SC_config may always be used to generate a DMRS sequence.

As another example, an nSCID parameter in the SC_config may be predefined to always use nSCID=1 for the higher rank states irrespective of the SC_config. In this case, if SC_config0={x(0), nSCID=0, $\Delta n_s$=0} is predefined for the higher rank states, when a dynamic indication of the higher rank states is given, {x(0), $\Delta n_s$=0} of SC_config0 and nSCID=1 predefined irrespective of the SC_config may always be used to generate a DMRS sequence.

Otherwise, if SC_config1={x(1), nSCID=1, $\Delta n_s$=6} is predefined for the higher rank states, when a dynamic indication of the higher rank states is given, {x(1), $\Delta n_s$=6} of SC_config1 and nSCID=1 predefined irrespective of the SC_config may always be used to generate a DMRS sequence.

The above-described methods (1), (2) and (3) may be modified to previously and semi-statically change a certain rule through RRC signaling.

Since a new table such as Table 9 actually includes a corresponding legacy table of Rel-10 (for example, the corresponding legacy table of Rel-10 can be achieved by setting x(0) as PCID, setting $\Delta n_s$=0, and setting nSCID to 0 or 1 as in the legacy table), the new table may be predefined to completely replace the legacy table.

Alternatively, the new table such as Table 9 may be predefined to replace the legacy table only when information about the specific DMRS configuration parameter set (SC_config0, SC_config1, . . . ) and mapping relations between the SC_configs and dynamic indication bit(s) mapped thereto in the table (a mapping rule can be predefined) are provided to a specific UE through UE-dedicated RRC signaling (or only when an explicit RRC indication bit instructing to use this new table is received). That is, if such RRC signaling is not provided, the UE may operate according to the legacy table or may be configured to have default parameter configurations such as SC_config0={PCID nSCID=0, $\Delta n_s$=0} and SC_config1={PCID, nSCID=1, $\Delta n_s$=0}.

Figure 11:
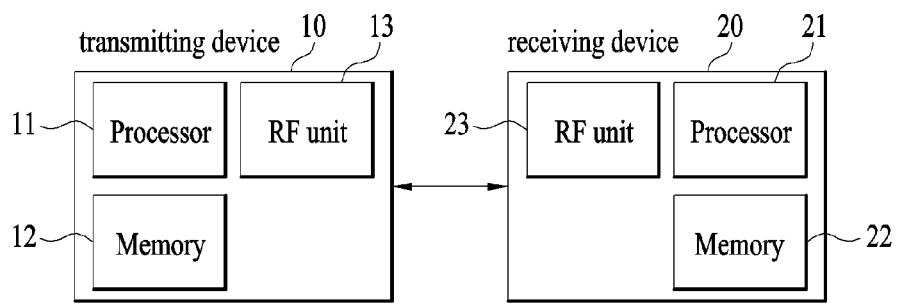
FIG. 11 is a block diagram of apparatuses for implementing embodiment(s) of the present invention.

FIG. 11 is a block diagram of components of the transmitter 10 and the receiver 20 for implementing embodiments of the present invention. The transmitter 10 and the receiver 20 include Radio Frequency (RF) units 13 and 23 for transmitting or receiving radio signals carrying information and/or data, signals, messages or the like, memories 12 and 22 for storing various types of information related to communication in a wireless communication system, and processors 11 and 21 operatively connected to components such as the RF units 13 and 23 and the memories 12 and 22 to control the memories 12 and 22 and/or the RF units 13 and 23 to implement at least one of the afore-described embodiments of the present invention, respectively.

The memory 12 or 22 may store programs for processing and control of the processor 11 or 21 and temporarily store input/output information. The memory 12 or 22 may be used as a buffer. The processor 11 or 21 generally provides overall control to various modules in the transmitter 10 or the receiver 20. Particularly, the processor 11 or 21 may perform various control functions for implementing the present invention. The processor 11 or 21 may also be referred to as a controller, a microcontroller, a microprocessor, a microcomputer or the like. The processor 11 or 21 may be configured by hardware, firmware, software, or a combination thereof. In the hardware configuration, the processor 11 or 21 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured to implement the present invention. In the firmware or software configuration, the firmware or the software may be configured to include a module, a procedure, a function, etc. which perform functions or operations of the present invention. The firmware or software configured to implement the present invention may be included in the processor 11 or 21 or may be stored in the memory 12 or 22 and executed by the processor 11 or 21.

The processor 11 of the transmitter 10 codes and modulates signals and/or data scheduled by the processor 11 or by a scheduler connected to the processor 11 and transmits the coded and modulated signals and/or data to the RF unit 13. For example, the processor 11 converts a data stream to be transmitted into K layers through demultiplexing, channel coding, scrambling, modulation, etc. The coded data stream is also referred to as a codeword equivalent to a Transport Block (TB) which is a data block provided by a Medium Access Control (MAC) layer. A TB is coded to a codeword and each codeword is transmitted to the receiver 20 in the form of one or more layers. The RF unit 13 may include an oscillator for frequency up-conversion. The RF unit 13 may include Nt transmission antennas (where Nt is a positive integer equal to or greater than 1).

A signal processing procedure of the receiver 20 is performed in reverse order of the signal processing procedure of the transmitter 10. The RF unit 23 of the receiver 20 receives radio signals transmitted from the transmitter 10 under the control of the processor 21. The RF unit 23 may include Nr reception antennas. The RF unit 23 restores each of the signals received through the reception antennas to a baseband signal through frequency down-conversion. The RF unit 23 may include an oscillator for frequency down-conversion. The processor 21 may restore the data transmitted from transmitter 10 by decoding and demodulating the radio signals received through the reception antennas.

The RF unit 13 or 23 includes one or more antennas. The antennas are used to transmit signals processed by the RF unit 13 or 23 or receive and transmit external radio signals to the RF unit 13 or 23 under the control of the processor 11 or 21. The antennas are also referred to as antenna ports. Each antenna may correspond to one physical antenna or may be configured using two or more physical antenna elements. A signal transmitted from each antenna cannot be further divided by the receiver 20. A Reference Signal (RS) transmitted through an antenna defines the antenna in view of the receiver 20, and enables the receiver 20 to perform channel estimation for the antenna irrespective of whether a channel is a single radio channel from one physical antenna or a composite channel from a plurality of physical antenna elements included in the antenna. That is, the antenna is defined in such a manner that a channel carrying a symbol through the antenna may be derived from a channel carrying another symbol through the same antenna. An RF unit supporting Multi-Input Multi-Output (MIMO) for data transmission and reception using multiple antennas may be connected to two or more antennas.

In embodiments of the present invention, a UE operates as the transmitter 10 for uplink, and operates as the receiver 20 for downlink. In embodiments of the present invention, an eNB operates as the receiver 20 for uplink, and operates as the transmitter 10 for downlink.

The transmitter 10 and/or the receiver 20 may implement at least one of or a combination of two or more of the afore-described embodiments of the present invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication devices such as a UE, a relay and a BS.

The invention claimed is:

1. A method for receiving a downlink signal by a User Equipment (UE) in a wireless communication system supporting Coordinated Multiple Point transmission and reception (CoMP), the method comprising:
   receiving information about at least two candidate Demodulation Reference Signal (DMRS) configuration parameter sets for generating a sequence of a downlink DMRS; and
   generating the sequence of the downlink DMRS using one of the at least two candidate DMRS configuration parameter sets,
   wherein each of the at least two candidate DMRS configuration parameter sets includes a cell identity and a scrambling identity, and
   wherein the scrambling identity included in one of the at least two candidate DMRS configuration parameter sets is determined based on whether two cell identities respectively included in the at least two candidate DMRS configuration parameter sets are identical to each other.

2. The method according to claim 1, wherein, if the two cell identities are not identical, the scrambling identity included in one of the at least two candidate DMRS configuration parameter sets is determined to be identical to the scrambling identity included in another of the at least two candidate DMRS configuration parameter sets.

3. The method according to claim 1, wherein, if the two cell identities are identical, the scrambling identity included in one of the at least two candidate DMRS configuration parameter sets is determined to be different from the scrambling identity included in another of the at least two candidate DMRS configuration parameter sets.

4. The method according to claim 1, further comprising receiving a signal indicating one of the at least two candidate DMRS configuration parameter sets.

5. The method according to claim 4, wherein the signal is specific information included in downlink control information.

6. The method according to claim 4, wherein the signal is additional information other than specific information included in downlink control information.

7. The method according to claim 1, wherein each of the at least two candidate DMRS configuration parameter sets further comprises information about slot number of a radio frame, and
   wherein the information about the slot number of the radio frame indicates a difference value between slot number of a radio frame of a serving cell and slot number of a radio frame of a cell other than the serving cell.

8. The method according to claim 1, wherein the cell identity included in each of the at least two candidate DMRS configuration parameter sets is a virtual cell identity.

9. A method for transmitting a downlink signal by a Base Station (BS) in a wireless communication system supporting Coordinated Multiple Point transmission and reception (CoMP), the method comprising transmitting information about at least two candidate Demodulation Reference Signal (DMRS) configuration parameter sets for generating a sequence of a downlink DMRS,
   wherein one of the at least two candidate DMRS configuration parameter sets is used to generate the sequence of the downlink DMRS,
   wherein each of the at least two candidate DMRS configuration parameter sets includes a cell identity and a scrambling identity, and
   wherein the scrambling identity included in one of the at least two candidate DMRS configuration parameter sets is determined based on whether two cell identities respectively included in the at least two candidate DMRS configuration parameter sets are identical to each other.

10. The method according to claim 9, wherein the cell identity included in each of the at least two candidate DMRS configuration parameter sets is a virtual cell identity.

11. A User Equipment (UE) configured to receive a downlink signal in a wireless communication system supporting Coordinated Multiple Point transmission and reception (CoMP), the UE comprising:
    a processor configured to receive information about at least two candidate Demodulation Reference Signal (DMRS) configuration parameter sets for generating a sequence of a downlink DMRS, and generate the sequence of the downlink DMRS using one of the at least two candidate DMRS configuration parameter sets,
    wherein each of the at least two candidate DMRS configuration parameter sets includes a cell identity and a scrambling identity, and
    wherein the scrambling identity included in one of the at least two candidate DMRS configuration parameter sets is determined based on whether two cell identities respectively included in the at least two candidate DMRS configuration parameter sets are identical to each other.

12. The UE according to claim 11, wherein, if the two cell identities are not identical, the scrambling identity included in one of the at least two candidate DMRS configuration parameter sets is determined to be identical to the scrambling identity included in another of the at least two candidate DMRS configuration parameter sets.

13. The UE according to claim 11, wherein, if the two cell identities are identical, the scrambling identity included in one of the at least two candidate DMRS configuration parameter sets is determined to be different from the scrambling identity included in another of the at least two candidate DMRS configuration parameter sets.

14. The UE according to claim 11, wherein the processor is configured to further receive a signal indicating one of the at least two candidate DMRS configuration parameter sets.

15. The UE according to claim 14, wherein the signal is specific information included in downlink control information.

16. The UE according to claim 14, wherein the signal is additional information other than specific information included in downlink control information.

17. The UE according to claim 11, wherein each of the at least two candidate DMRS configuration parameter sets further includes information about slot number of a radio frame, and
wherein the information about the slot number of the radio frame indicates a difference value between slot number of a radio frame of a serving cell and slot number of a radio frame of a cell other than the serving cell.

18. The UE according to claim 11, wherein the cell identity included in each of the at least two candidate DMRS configuration parameter sets is a virtual cell identity.

19. A Base Station (BS) for transmitting a downlink signal in a wireless communication system supporting Coordinated Multiple Point transmission and reception (CoMP), the BS comprising:
a processor configured to transmit information about at least two candidate Demodulation Reference Signal (DMRS) configuration parameter sets for generating a sequence of a downlink DMRS, to a User Equipment (UE),
wherein one of the at least two candidate DMRS configuration parameter sets is used to generate the sequence of the downlink DMRS,
wherein each of the at least two candidate DMRS configuration parameter sets includes a cell identity and a scrambling identity, and
wherein the scrambling identity included in one of the at least two candidate DMRS configuration parameter sets is determined based on whether two cell identities respectively included in the at least two candidate DMRS configuration parameter sets are identical to each other.

20. The BS according to claim 19, wherein the cell identity included in each of the at least two candidate DMRS configuration parameter sets is a virtual cell identity.

* * * * *